May 11, 1937.　　　F. J. SHOOK　　　2,080,013
APPARATUS FOR WRAPPING TIRE BEADS
Filed June 1, 1934　　　13 Sheets-Sheet 8

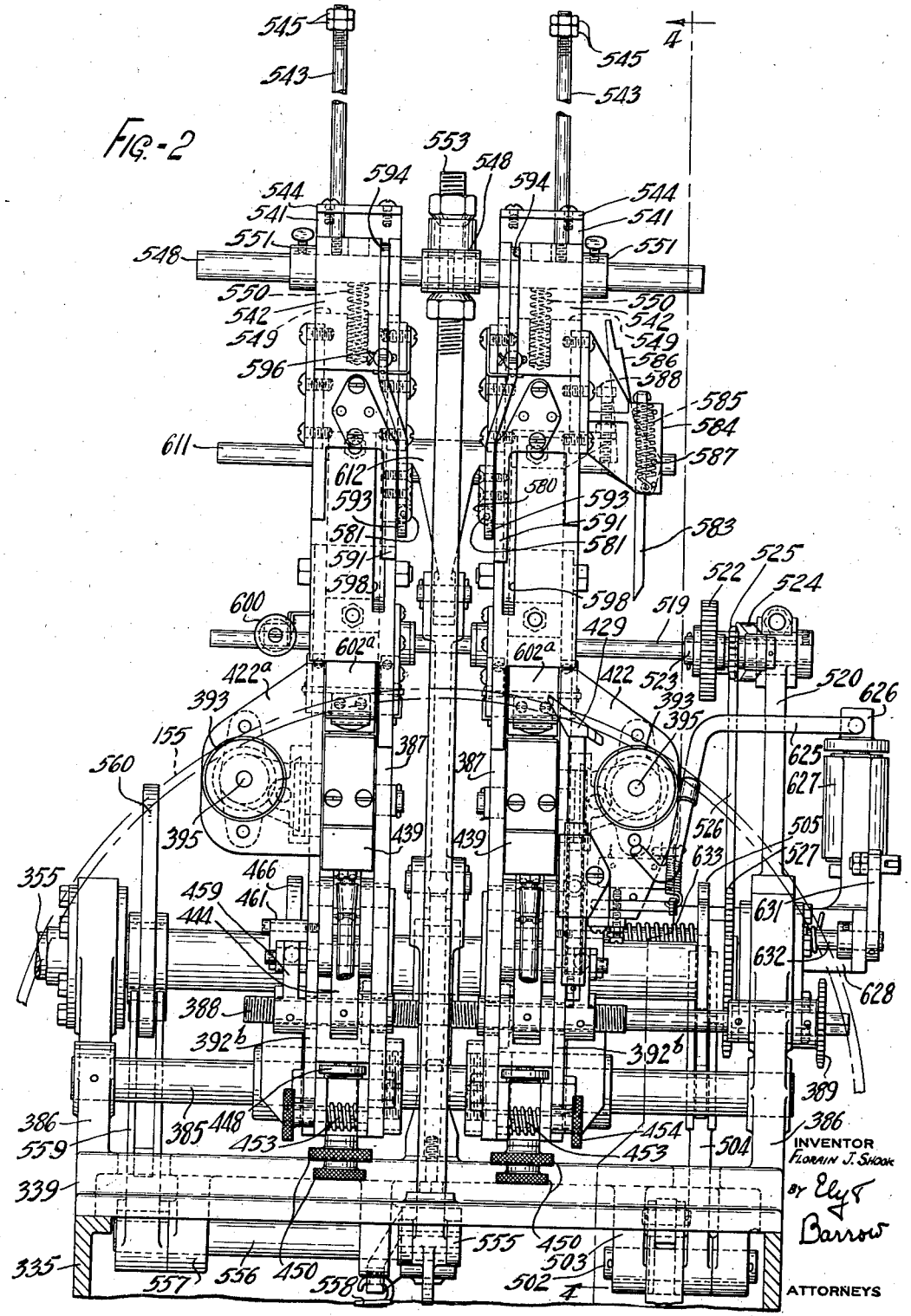

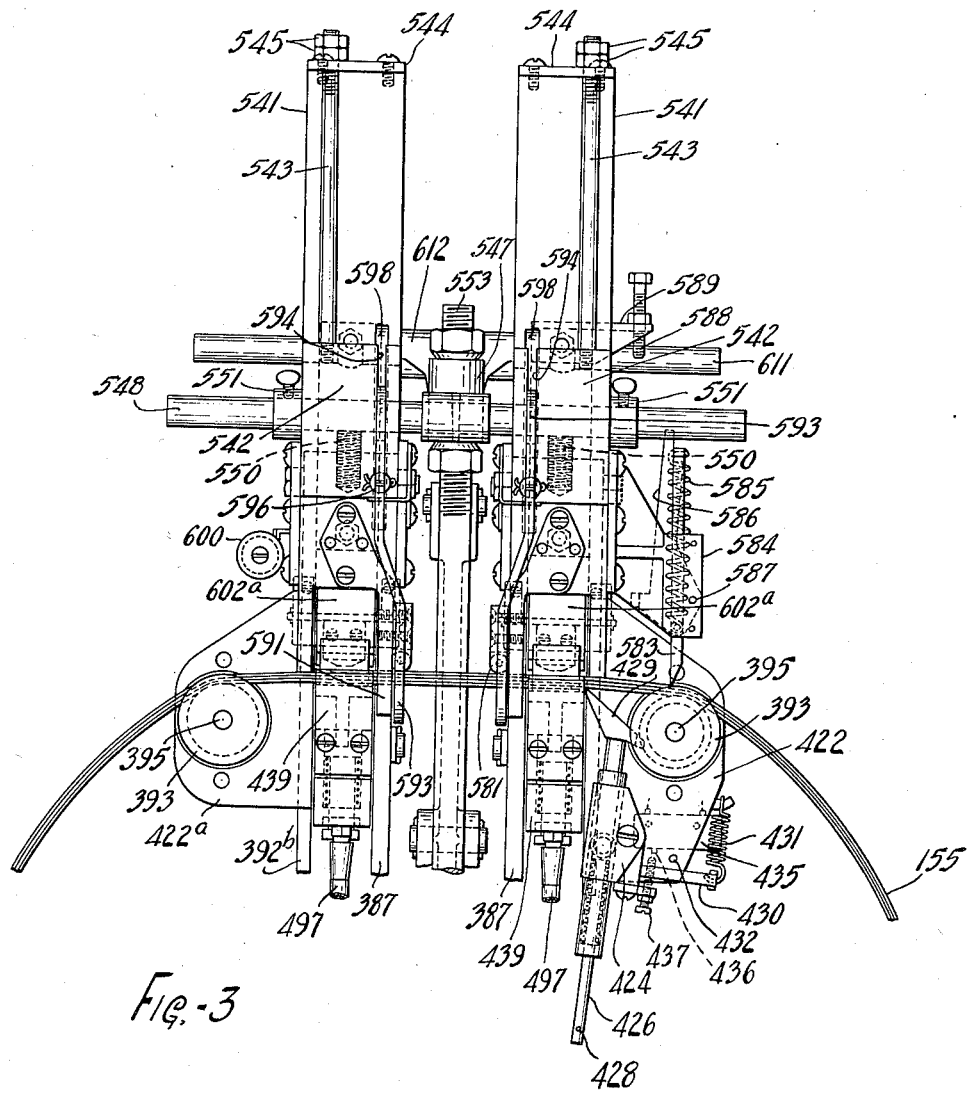

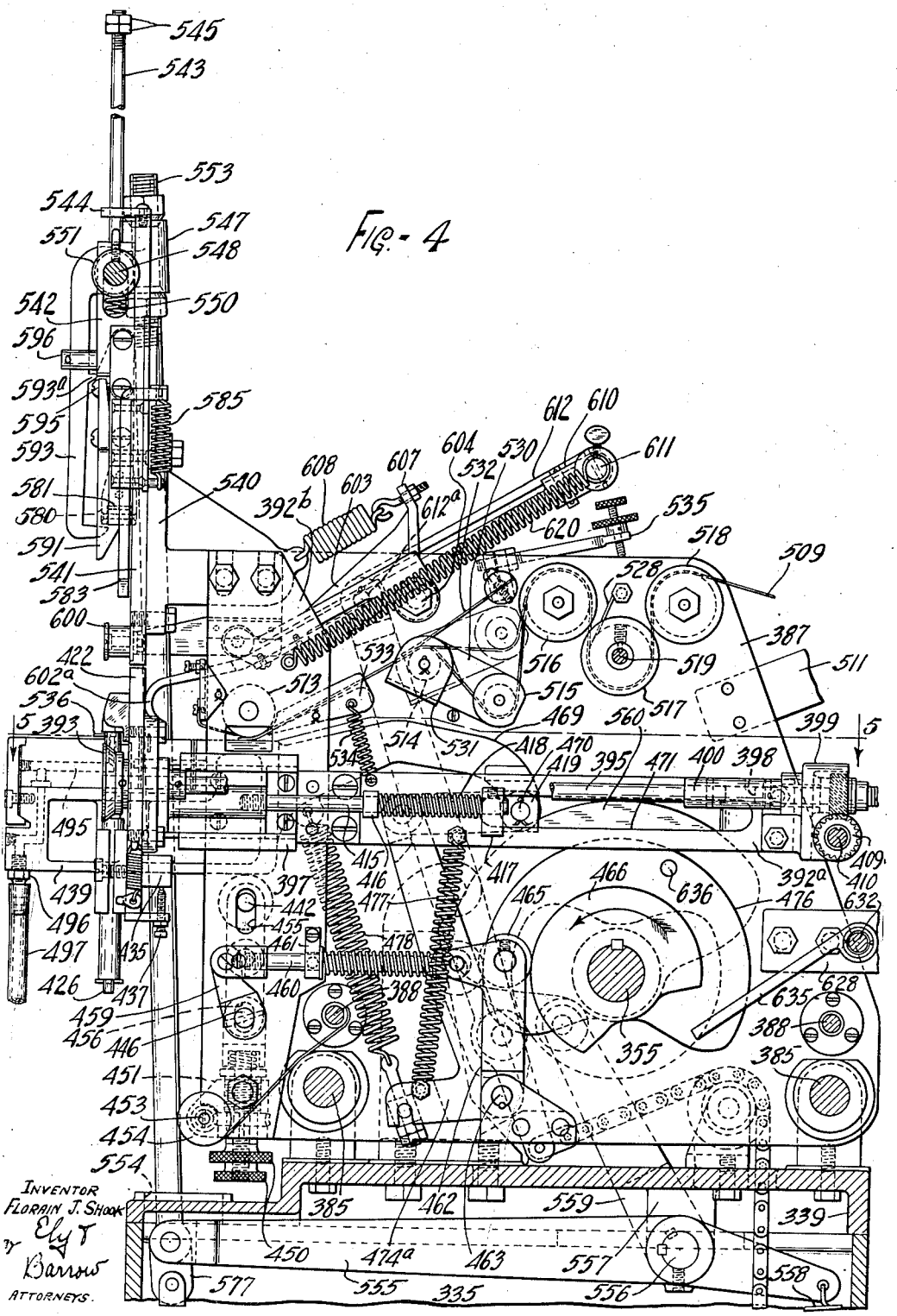

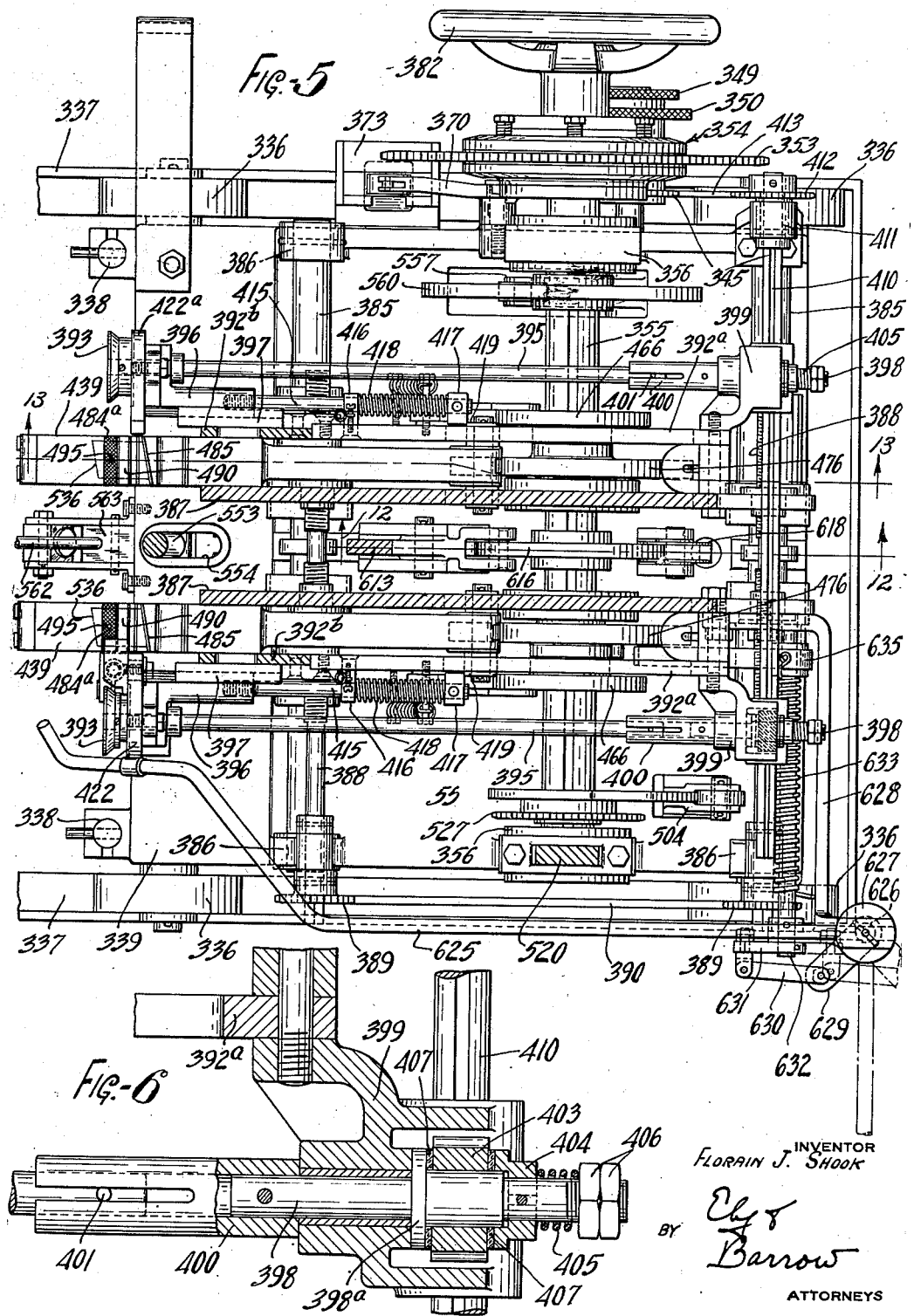

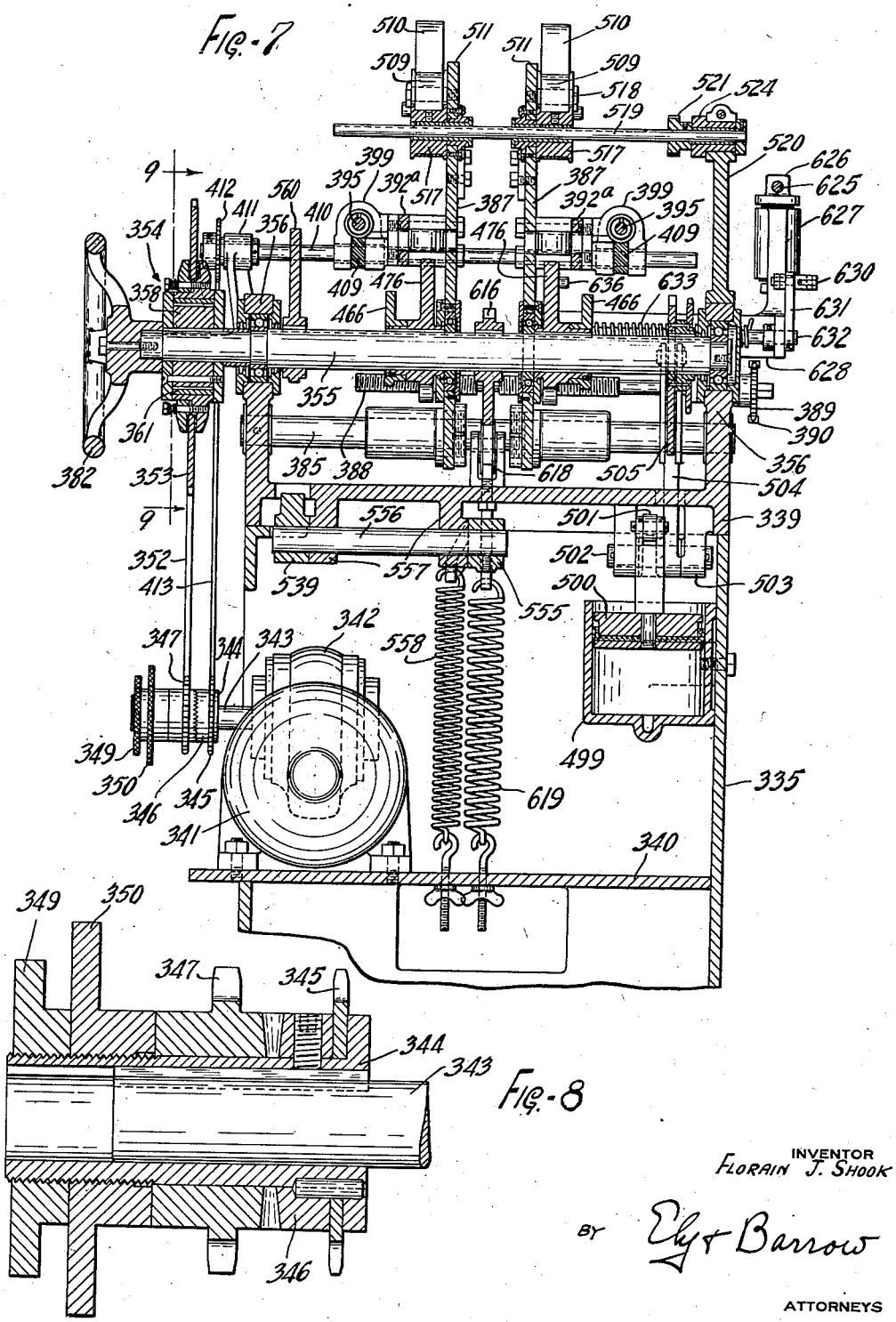

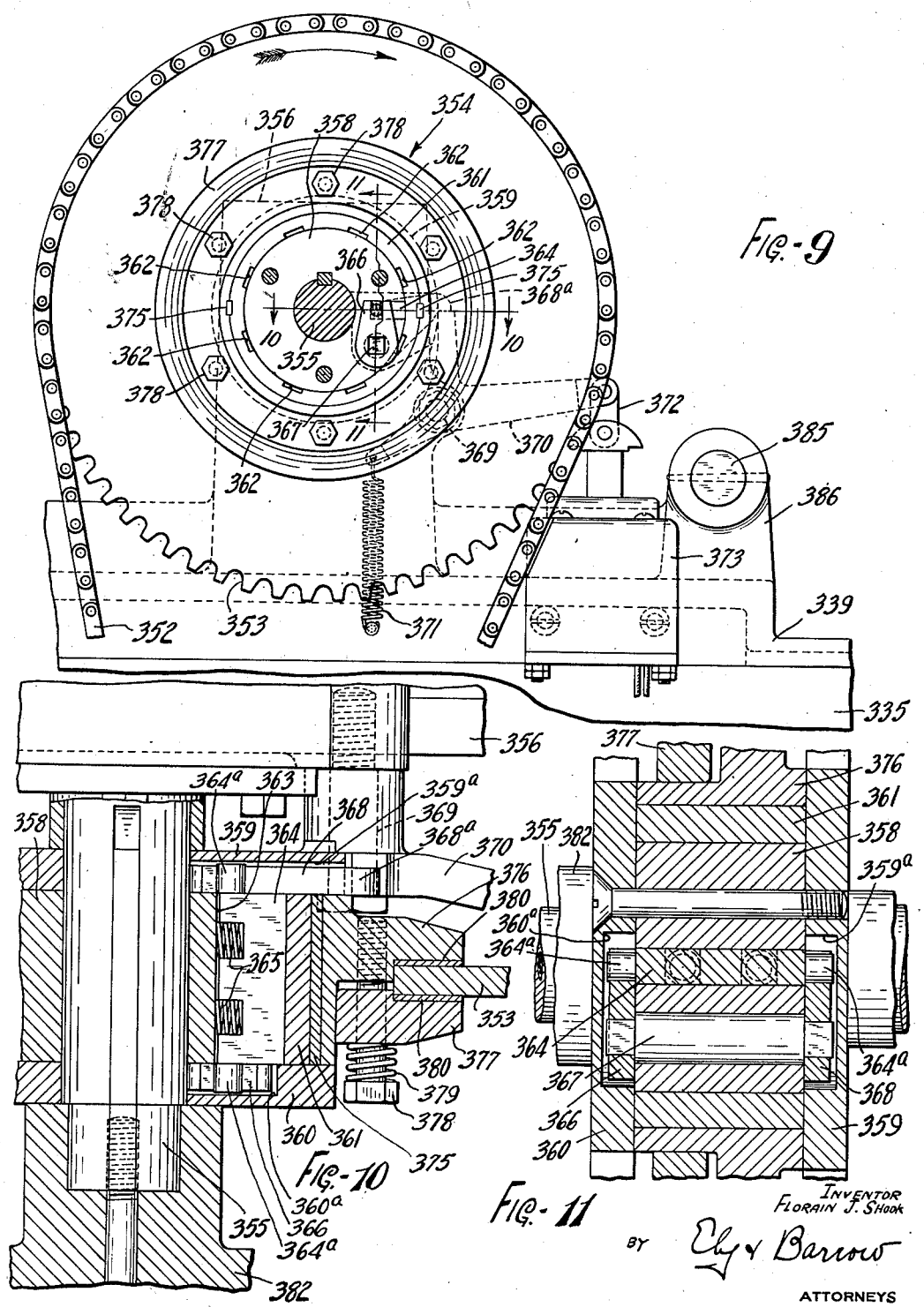

INVENTOR
FLORAIN J. SHOOK

BY

ATTORNEYS

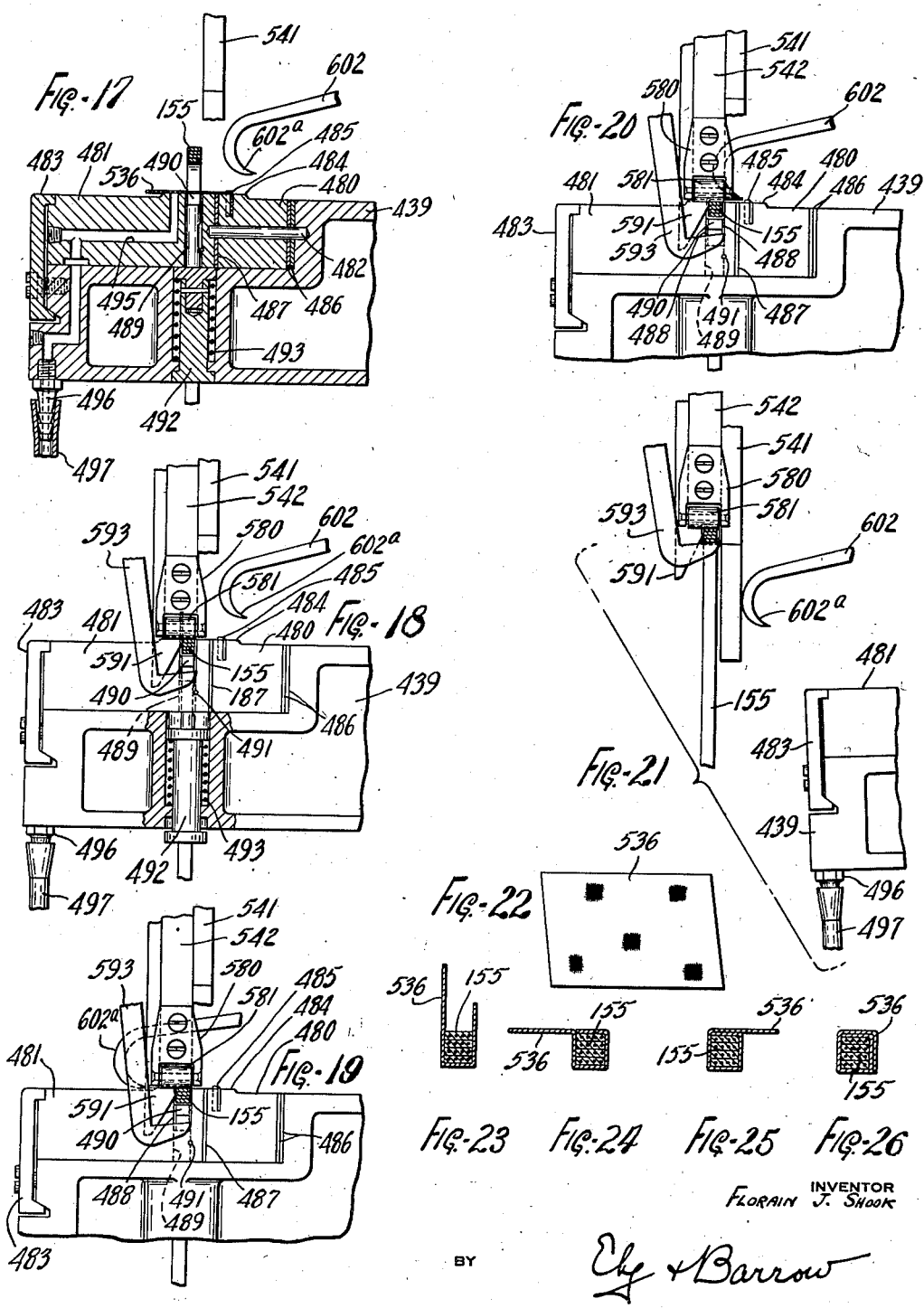

May 11, 1937.　　　F. J. SHOOK　　　2,080,013
APPARATUS FOR WRAPPING TIRE BEADS
Filed June 1, 1934　　　13 Sheets-Sheet 13
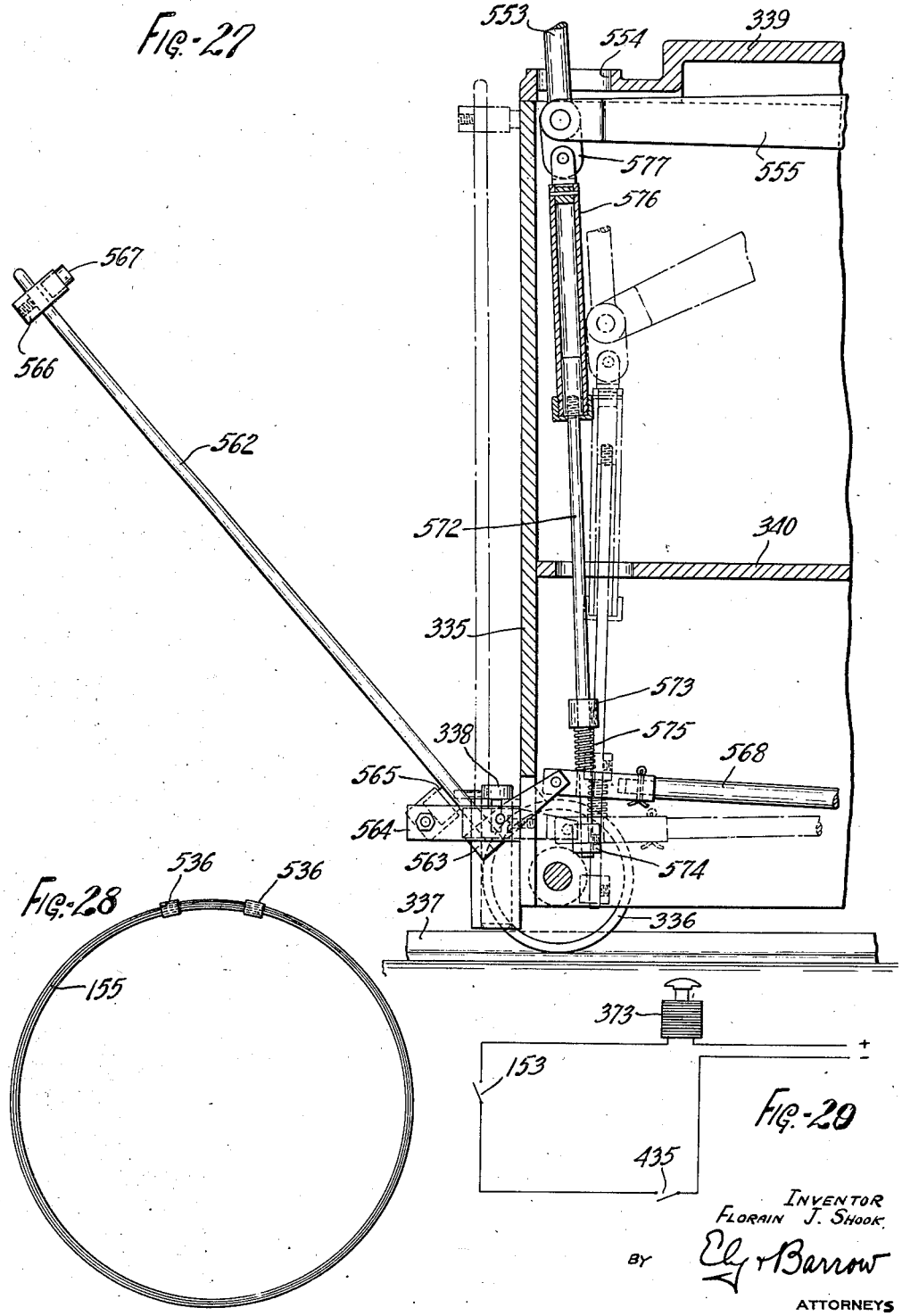

Patented May 11, 1937

2,080,013

UNITED STATES PATENT OFFICE 2,080,013

APPARATUS FOR WRAPPING TIRE BEADS

Florain J. Shook, Akron, Ohio, assignor to National-Standard Company, Niles, Mich., a corporation of Michigan Application June 1, 1934, Serial No. 728,557

43 Claims. (Cl. 117—1)

This invention relates to apparatus for use in the making of tire beads, and more especially it relates to apparatus for folding one or more short lengths of wrapper material about an annular tire bead element composed of a plurality of convolutions of rubberized wire tape, to bind one or both ends of the tape to the body thereof, the finished structure constituting an inextensible bead core suitable for building into the lateral marginal portions of a pneumatic tire casing.

The chief objects of the invention are to increase production of bead cores of the character mentioned; to provide apparatus that is fully automatic in operation; to provide apparatus of low maintenance cost, to provide apparatus that is capable of rapid action and large production; to provide apparatus capable of operating on bead cores of different thicknesses; and to provide apparatus that is readily adjustable so as to operate upon bead cores having greater or lesser amount of overlap of the wire of which they are composed. Other objects will be manifest as the specification proceeds.

Of the accompanying drawings,

Figure 2 is a front elevation, on a larger scale, of the upper half of the mechanism shown in Figure 1;

Figure 3 is a fragmentary view similar to Figure 2 showing the mechanism in operative position;

Figure 4 is a section on the line 4—4 of Figure 2;

Figure 5 is a section on the line 5—5 of Figure 4;

Figure 6 is a horizontal sectional view of one of the frictional driving mechanisms shown in Figure 5;

Figure 7 is a section on the line 7—7 of Figure 1;

Figure 8 is a vertical section, on a larger scale, of the motor-driven shaft shown in Figure 7;

Figure 9 is a sectional view of a one revolution clutch, taken on the line 9—9 of Figure 7;

Figure 10 is a section on the line 10—10 of Figure 9;

Figure 11 is a section on the line 11—11 of Figure 9;

Figure 17 is a sectional view, partly in elevation, of the instrumentalities that fold a wrapper, consisting of a short length of adhesive tape, about an exposed end of the rubberized wire tape of a bead core, said instrumentalities being shown in the relative positions they occupy as the bead core initially is delivered thereto;

Figures 18, 19, 20 and 21 are views of the mechanism shown in Figure 17, in the succession of positions they assume in folding the wrapper tape about the bead core;

Figure 22 is a plan view of a fabric wrapper such as is used for binding the ends of the bead-tape to the body thereof;

Figures 23, 24, 25 and 26 are enlarged detail sectional views of the bead core and wrapper thereon as they appear in Figures 18, 19, 20 and 21 respectively;

Figure 27 is a vertical section through the lower part of the apparatus shown in Figure 1, at the front thereof, showing mechanism for operating the work holder thereat;

Figure 28 is an elevation of a tire bead core constituting the finished product of the apparatus; and Figure 29 is a wiring diagram of an electrical circuit by means of which timed operation of the wrapping unit and a bead winding device (not shown) is controlled.

Figure 1:
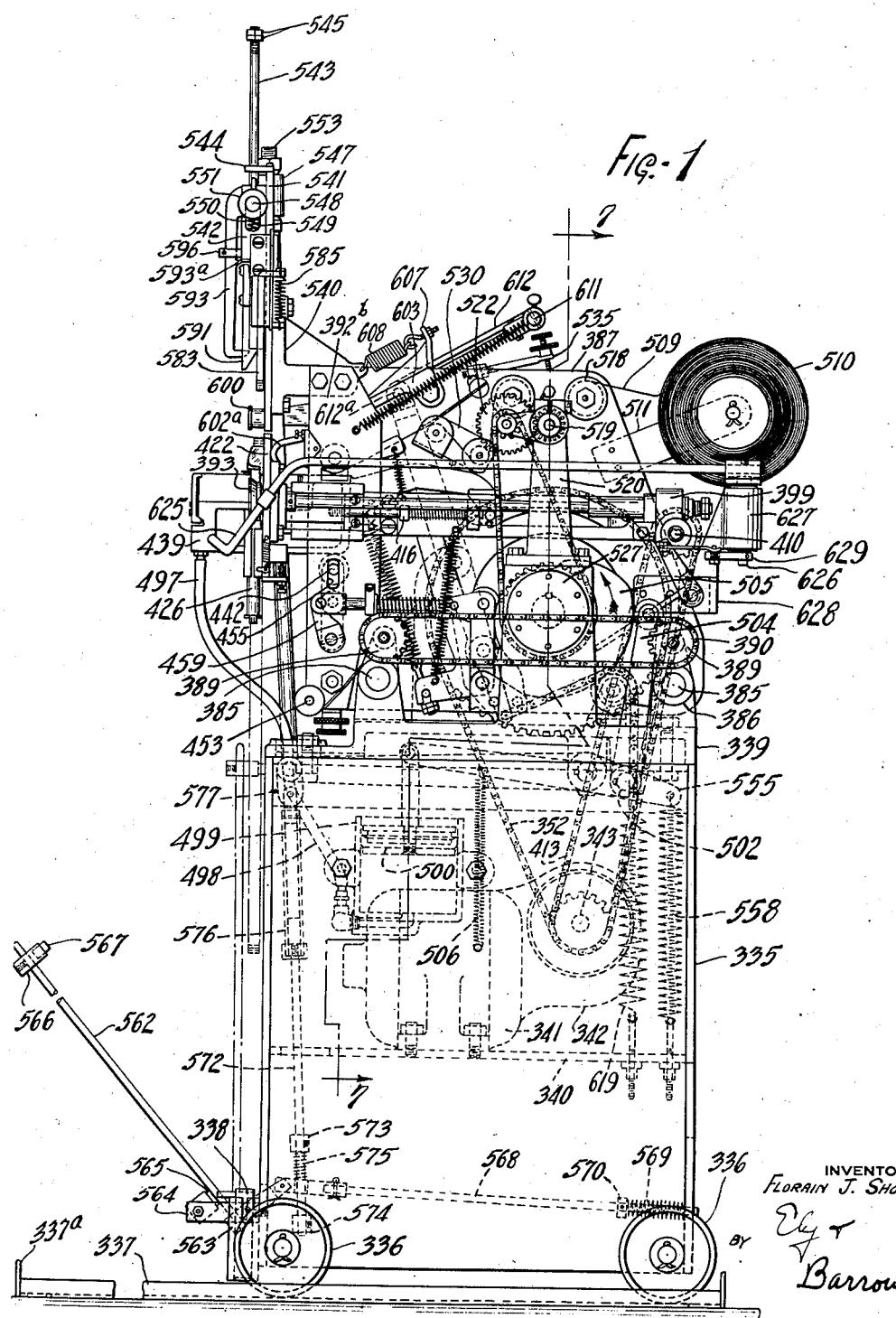
Figure 1 is a side elevation of the bead wrapping unit of the apparatus, in inoperative position.

The illustrative embodiment of the invention shown herein consists of the wrapping unit of apparatus for building bead structures for pneumatic tires, particularly such bead structures as comprise an annular bead core consisting of a plurality of convolutions of rubberized wire tape. The function of the wrapping unit is to apply short lengths of binder material, such as friction tape, adhesively to one or both ends of the wire tape to bind said ends to the body of the bead core.

The wrapping unit that constitutes this invention may be and preferably is associated with apparatus for winding the bead cores, and may receive the bead cores directly from said winding unit without manual intervention. When the wrapping unit is associated with a winding unit, electrically operated mechanism is provided for causing the wrapping unit to operate in determinate timed relation to the operations of the winding unit. Thus when a bead core is delivered to the wrapping unit from a winding unit, said bead core initially is suspended upon a pair of feed rollers that feed it angularly about its axis until the end of the wire tape on its inner periphery strikes a yielding stop, which stop is associated with a normally open electrical switch that is in series with a switch on the winding unit so that the wrapping unit operates when the latter switch closes. At the time the bead core comes to rest as described, the respective ends of its constituent tape are positioned above respective anvils that are formed with slots that are in alignment with the bead core, there being short strips of friction tape overlying said slots. When the wrapping unit is set in motion by the winding unit, it executes a sequence of operations whereby the respective friction tapes are folded about the bead cores in the regions of the wire tape ends and the finished work ejected from the machine.

If the wrapping unit is to operate independently of a winding unit, it will be set in motion by the closing of the switch that is associated with said positive stop. In either case the bead cores may be mounted in the unit in chance arrangement as regards the end portions of the bead-tape since the machine includes means for turning the bead angularly until said end portions are determinately positioned, and will not operate until they are so positioned.

*General description*

The wrapping unit herein shown is adapted to fold short lengths of adhesive tape about a bead core 155 so as to bind the respective ends of the rubberized wire tape, of which the core is constructed, to the body of the structure so as to facilitate subsequent handling of the core preparatory to incorporating it on a tire structure. This operation is especially desirable with relation to the trailing end of the tape since this end is disposed upon the outer periphery of the bead core and consequently is more likely to pull away from the body of the core by reason of its natural springiness. Thus although the apparatus as shown comprises dual mechanisms of similar arrangement and operation for binding the bead core in two places, it is possible, without departing from the spirit of the invention, to construct the wrapping unit with but a single mechanism for binding the trailing end of the bead core tape. Said dual mechanisms are adjustable laterally, relatively of each other, to provide for the taping of bead cores having tape-end overlaps of different lengths.

Briefly, the wrapping unit comprises means for receiving the bead core 155 and for feeding said bead core angularly about its own axis until it reaches a determinate angular position whereat it closes an electrical switch that is in series with switch 153 of the winding unit, a pair of reciprocable anvils having transverse slots or dies, means for positioning short lengths of friction tape over said slots or dies, means for moving the bead core so that the regions thereof containing the leading and trailing ends of its tape are pressed into said anvil dies and subsequently lifted therefrom, means for folding the end portions of the friction tapes around the work while it is in said anvil-wells, and means for removing the finished work from the machine.

Referring now to the drawings, the machine comprises a box-like housing 335 mounted upon four wheels 336, 336 that rest upon a trackway consisting of flanged rails 337, 337 positioned in front of the winding unit hereinbefore mentioned. The arrangement is such that the wrapping unit may be moved from its normal operative position, immediately adjacent the winding unit, to a retracted position to permit necessary work to be done on the winding unit, for example, changing the winding form thereof. The front end of the housing 335 is provided with a pair of vertically arranged slide bolts 338, 338 which may be lowered into suitable recesses in the floor or a transverse rail 337ª for holding the wrapping unit securely in operative position adjacent the winding unit.

The top of housing 335 consists of a baseplate 339 that is formed with various bearing brackets, etc. subsequently to be described. Within the housing 335 is a support or platform 340 upon which is mounted a normally constantly driven motor 341 that is equipped with a reduction gear device 342. Shaft 343 of the latter has keyed thereto a sleeve or quill 344, see Figures 7 and 8, upon which is fixedly mounted a sprocket 345 and one unit 346 of a clutch, said unit 346 having one lateral face formed with radially disposed serrations or teeth. Journaled on quill 344 is a second sprocket 347 having a hub portion formed with radial serrations complemental to the serrations on clutch unit 346 and constituting the other unit of the clutch structure. A pair of lock-nuts 349, 350 are threaded onto the outer end portion of quill 344 for holding sprocket 347 against clutch unit 346 with the clutch serrations interengaged so that sprocket 347 may be driven through clutch unit 346 by shaft 343. By loosening lock nuts 349, 350, sprocket 347 may be rotated relatively of shaft 343.

Sprocket 347 is connected by sprocket chain 352 with a sprocket 353 that is associated with a one-revolution clutch, generally designated 354, that is mounted upon one end portion of a cam shaft 355. The latter is disposed transversely of the apparatus and is journaled in respective bearing brackets 356, 356 formed integral with base plate 339, at opposite sides of the machine. As is most clearly shown in Figures 9, 10, and 11, the one-revolution clutch 354 comprises a cylindrical hub 358 that is keyed to cam shaft 355 between an inner and an outer end plate 359, 360 respectively, which end plates are bolted together through said hub and constitute flanges therefor. Journaled upon the perimeter of hub 358 is a clutch ring 361, the inner perimeter of which is formed with a circumferential series of transverse, spaced slots or keyways 362, 362. The hub 358 is formed with a radial slot or recess 363 in which is slidably mounted a key 364 that is backed by compression springs 365, the arrangement being such that key 364 normally is yieldingly urged outwardly toward clutch ring 361 so as to engage in one of the slots 362 therein.

The respective ends of key 364 are formed with studs 364ª that extend into respective recesses 359ª, 360ª formed in the adjacent faces of inner and outer end plates 359, 360 respectively. One of the studs 364ª is engaged in the forked end of a lever 366 that is positioned within recess 360ᵃ and is mounted upon one end of a rockshaft 367 that is journaled in hub 358. The other key-stud 364ᵃ is engaged by a lever 368 that is disposed within recess 359ᵃ and is mounted upon the other end of rock-shaft 367. Lever 368 is formed with an extension or dog 368ᵃ that projects beyond the perimeter of end plate 359. Pivotally mounted at 369 on adjacent bearing bracket 356 is a three armed lever 370, one arm of which normally projects into the orbit of dog 368ᵃ so as to be engaged by the latter and thereby to hold key 364 in retracted position, against springs 365, and out of clutch-ring-slots 362. A tension spring 371 connected to another arm of lever 370 and to a fixed point on base 339 normally urges the first mentioned arm of said lever into the orbit of said dog. The third arm of lever 370 has its free end connected to a link 372 that is connected to the core of a solenoid 373. The latter is in an electrical circuit with switch 153 on the winding unit, and a switch presently to be described on the wrapping unit, as shown in Figure 29, the arrangement being such that when said switches are closed the solenoid 373 is energized and thereby moves lever 370 in a manner to withdraw the arm thereof from engagement with dog 368ᵃ.

The clutch ring 361 is arranged to be constantly driven, and to this end carries the hub of sprocket 353 which is secured thereto by keys 375. Said sprocket hub comprises two lateral sections 376, 377, section 377 being secured to section 376 by bolts 378, 378 and yieldingly urged toward said section by compression springs 379 mounted upon said bolts. The adjacent faces of hub-sections 376, 377 are provided with friction facings 380, such as leather, which facings engage opposite faces of sprocket 353, the arrangement being such that said sprocket may rotate relatively of its hub, upon occasion, but normally driving said hub and clutch ring 361.

The sprocket chain 352 is driven at such speed that sprocket 353 makes less than one revolution during the interval that solenoid 373 is energized, at which time the lever 370 is withdrawn from dog 368, and key 364 is pressed outwardly into a clutch ring keyway 362, with the result that cam-shaft 355 is driven through the agency of hub 358, the lever 368 rotating with said hub. Before lever 368 has made one revolution, solenoid 373 has been deenergized and lever 370 again moved into the orbit of lever-dog 368ᵃ, which it engages to withdraw key 364 from clutch ring keyway 362 and thus to disconnect driving connection between sprocket 353 and shaft 355. Should the work in any manner become jammed in the machine during rotation of shaft 355, the sprocket 353 will move relatively of its hub sections 376, 377 by reason of its frictional mounting therein. The end of shaft 355 adjacent one-revolution clutch 354 is provided with a hand wheel 382 by means of which said shaft may be manually rotated to assist in extracting work which may have become jammed in the machine. Before manually rotating shaft 355 as described, it is necessary to loosen lock nuts 349, 350 so that sprocket 347 may be turned relatively of constantly driven motor-shaft 343.

A pair of support-and-guide rods 385, 385 are mounted at widely spaced points in end brackets 386, 386 that are formed upon base plate 339, said rods being parallel to each other and to cam shaft 355. The guide rods 385 slidably support a pair of parallel, vertically arranged plates 387, 387, which plates carry the respective elements of the dual mechanisms that wrap friction tape about the work at spaced points thereon. To provide for wrapping bead cores wherein the wrappings are spaced different distances apart, the plates 387 are laterally adjustable relatively of each other. To this end a pair of shafts 388, 388, each having right-hand and left-hand threads thereon, extend through said plates 387, the left-hand threads having threaded engagement with one plate and the right-hand threads having threaded engagement with the other plate. The shafts 388 are journaled at one end in suitable brackets formed integral with guide-rod brackets 386, the end portions of the shafts extending through said brackets and having mounted thereon respective sprockets 389 that are connected to each other by a sprocket chain 390. The ends of shafts 388 are squared to receive a tool such as a wrench whereby either shaft may be manually rotated, and thereby to rotate its companion shaft, to effect lateral adjustment of plates 387.

Each plate 387 has a side plate secured to its outer lateral face, in spaced relation thereto, each of said side plates being of general T-shape and comprising a horizontal portion 392ᵃ and a vertically disposed cross-piece 392ᵇ, the front margin of the latter being transversely aligned with the front margin of plate 387.

*Means for receiving the work and feeding it longitudinally*

When a bead core 155 is delivered to the wrapping unit, it drops upon a pair of relatively widely spaced apart, flanged feed rolls 393, 393 that are frictionally driven in the direction indicated by the arrows in the several drawings. Each roll 393 is mounted upon the front end of a horizontal shaft 395 that is journaled at its front end in a slide 396 mounted for horizontal movement in a dovetail slideway 397 secured on the outer face of outer plate member 392ᵇ. At its rear end each shaft 395 has a slip joint connection with a short shaft 398 journaled in a bearing bracket 399 mounted upon the outer face of outer frame member 392ᵃ, at the rear thereof. Said slip joint connection is best shown in Figure 6, and comprises a longitudinally slotted sleeve 400 secured to one end of shaft 398 and embracing the adjacent end of shaft 395, and a pin 401 in the latter extending into said slot in said sleeve, the arrangement permitting axial movement of shaft 395 relatively of shaft 398.

Each shaft 398 has a spiral gear 403 journaled thereon between a fixed flange 398ᵃ formed on said shaft and a collar 404 that is slidable axially thereon, said collar being yieldingly urged toward said gear by means of a compression spring 405 mounted upon the shaft between said collar and lock nuts 406 threaded onto the end of the shaft. The adjacent faces of flange 398ᵃ and collar 404 have respective facings 407 of frictional material such as fibre or leather so that shaft 398 and 395 may be frictionally driven when gear 403 is rotated.

The spiral gears 403 are meshed with respective spiral gears 408, 408, Figures 4 and 7, that are slidably keyed for axial movement upon a horizontal shaft 410 that is disposed transversely of shafts 398 and is journaled in the brackets 399. Shaft 410 extends to the side of the machine where handwheel 382 is located, and is journaled thereat in a bearing bracket 411 mounted upon one of brackets 386. The end portion of shaft 410 is provided with a sprocket 412 that is connected by sprocket chain 413 to sprocket 345 previously described on constantly driven shaft 343. The arrangement is such that feed rolls 393 are constantly frictionally driven, in the same direction so as to feed a bead core 155 longitudinally about its own axis. The purpose of this work-feeding operation is to bring that portion of the work, where its respective ends overlap, to a determinate position in the wrapping unit. It will be observed that plates 387 may be adjusted laterally of each other without disturbing the driving connection between shaft 410 and shafts 395.

The feed rolls 393 are movable axially in timed relation to the movement of the reciprocable anvils subsequently to be described for the purpose of being in work-receiving position when a bead core is delivered to the wrapping unit, and for moving out of the plane of the bead core, after the latter has been bound with friction tape, to permit removal of the finished work from the machine. To this end each slide 396 is provided with a rearwardly extending stem or push rod 415 that extends freely through an aperture in a block 416 that is fixed to the outer face of outer plate member 392. The rear end of rod 415 carries a head or collar 417, and a compression spring 418 is mounted upon the said rod between its head 417 and block 416, the arrangement being such that slide 396 normally is urged rearwardly. The head 417 is disposed close to side plate 392ª, in the path of a reciprocable slide block 419 that is associated with the anvil-operating apparatus, as is most clearly shown in Figures 4 and 5. The said slide block moves to a forward position when the anvil is projected to operative position, and thus slide 396 and with it feed roll 393 are moved forwardly to work-receiving position, against the pressure of spring 418.

Figure 15:
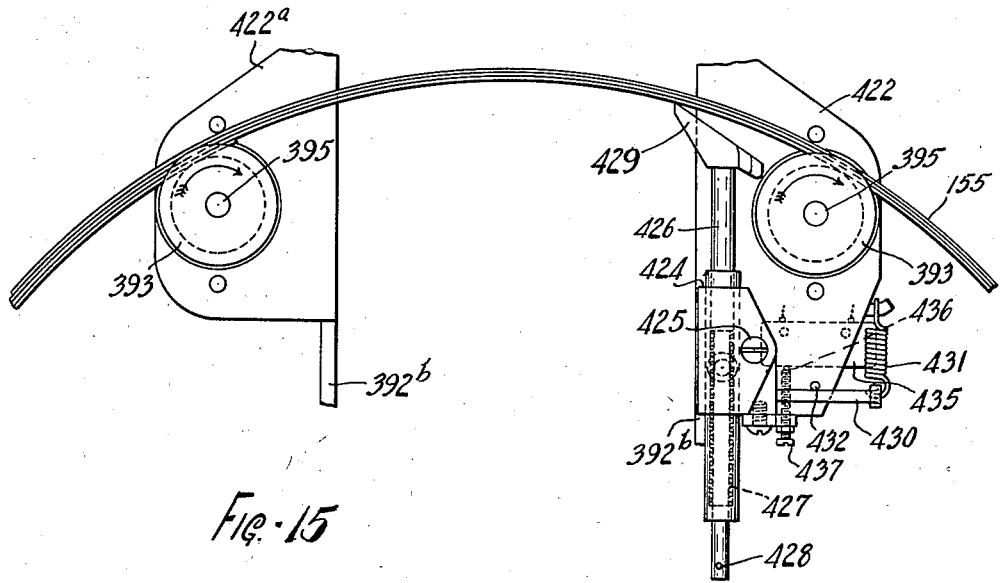
Figure 15 is a detail view of the feed rollers at the front of the wrapping unit, and the work therein in the angular position in which it is delivered thereto.
Figure 16:
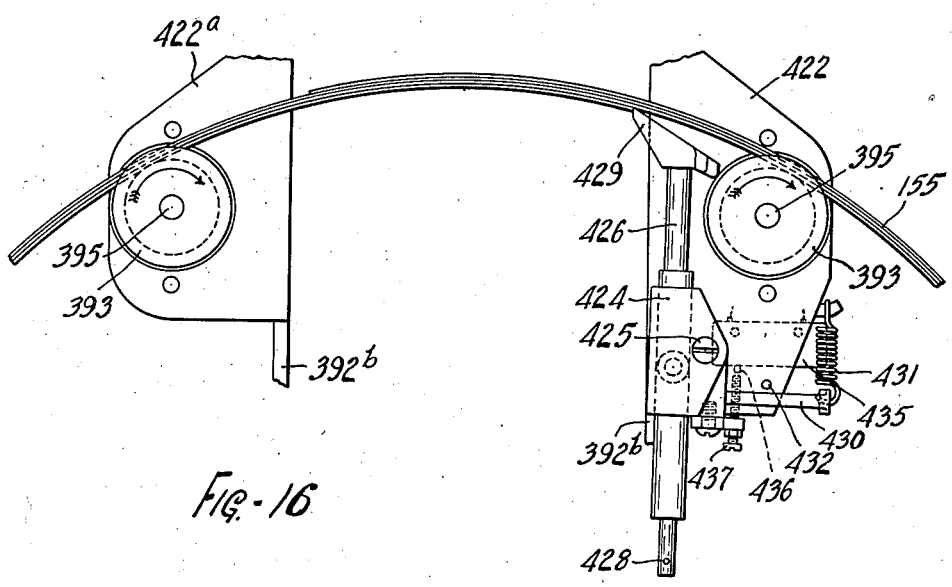
Figure 16 is a view of the mechanism shown in Figure 15, showing the work after it has been advanced by the feed rollers to a yielding stop, the latter controlling a switch in the electrical circuit that operates the device.

Associated with each feed roll 393 is a placer plate that assists in maintaining the work in a vertical plane when it is positioned upon said feed rolls. These placer plates are not identical in size and shape, that designated 422 and associated with the right-hand feed roll, as viewed from the front of the machine, being somewhat larger than the placer plate designated 422ª, which is associated with the left-hand feed roll. The said placer plates are mounted upon the front ends of the respective slides 396, immediately behind feed rolls 393, and each plate has its front face recessed slightly to receive the adjacent inner flange of the feed roll. Placer plate 422 carries the mechanism that stops bead core 155 in determinate angular position as it is being fed longitudinally by feed rolls 393, and also carries a normally open control switch that becomes closed as the work comes to a stop, see Figures 15 and 16.

For so stopping rotation of the work, a bracket 424 is pivotally mounted at 425 on placer plate 422, said bracket carrying a normally vertically disposed rod 426 that is slidably mounted in said bracket and yieldingly urged upwardly therein by a compression spring 427, there being a stop pin 428 through the lower end of the rod to limit said upward movement thereof. The upper end of rod 426 carries a pawl or finger 429 that is so positioned as yieldingly to engage the inner peripheral surface of a bead core 155 when the latter is supported upon feed rollers 393. The bracket 424 is provided with a laterally extending arm 430 that has its free end connected to one end of a tension spring 431 connected at its other end to a fixed point on placer plate 422. A stud 432 projecting from plate 422 is abutted by said arm 430, said stud constituting a positive stop for bracket 424 whereby the latter normally is yieldingly held in vertical position by spring 431. The bead cores 155 are so wound that when one of them is rotated longitudinally in the direction indicated by the arrows, the inner end of its constituent wire tape moves toward pawl 429, and by engaging the same, tilts bracket 424 from the position shown in Figure 15 to the position shown in Figure 16, against the tension of spring 431. When the tension of spring 431 stops further tilting of bracket 424 and longitudinal movement of bead core 155 ceases, feed rolls 393 stop rotating by reason of slippage between gear 403 and friction discs 407.

Mounted upon the back of placer plate 422 is a normally open electrical switch 435 that is in series with switch 153 of the winding unit in the electrical circuit that comprises solenoid 373, shown in Figure 29. Switch 435 has an operating stud or button 436 so positioned as to be engaged by a threaded stud 437 adjustably mounted upon a portion of bracket 424. Stud 437 engages button 436 to open switch 435 when bracket 424 is in the upright position shown in Figure 15, and releases said button to close the switch when said bracket is tilted to the position shown in Figure 16. When switch 435 is closed by action of the work as described, the wrapping unit is in position to execute a cycle of operation, waiting only upon closing of switch 153 on the winding unit.

*The anvils*

Figure 13:
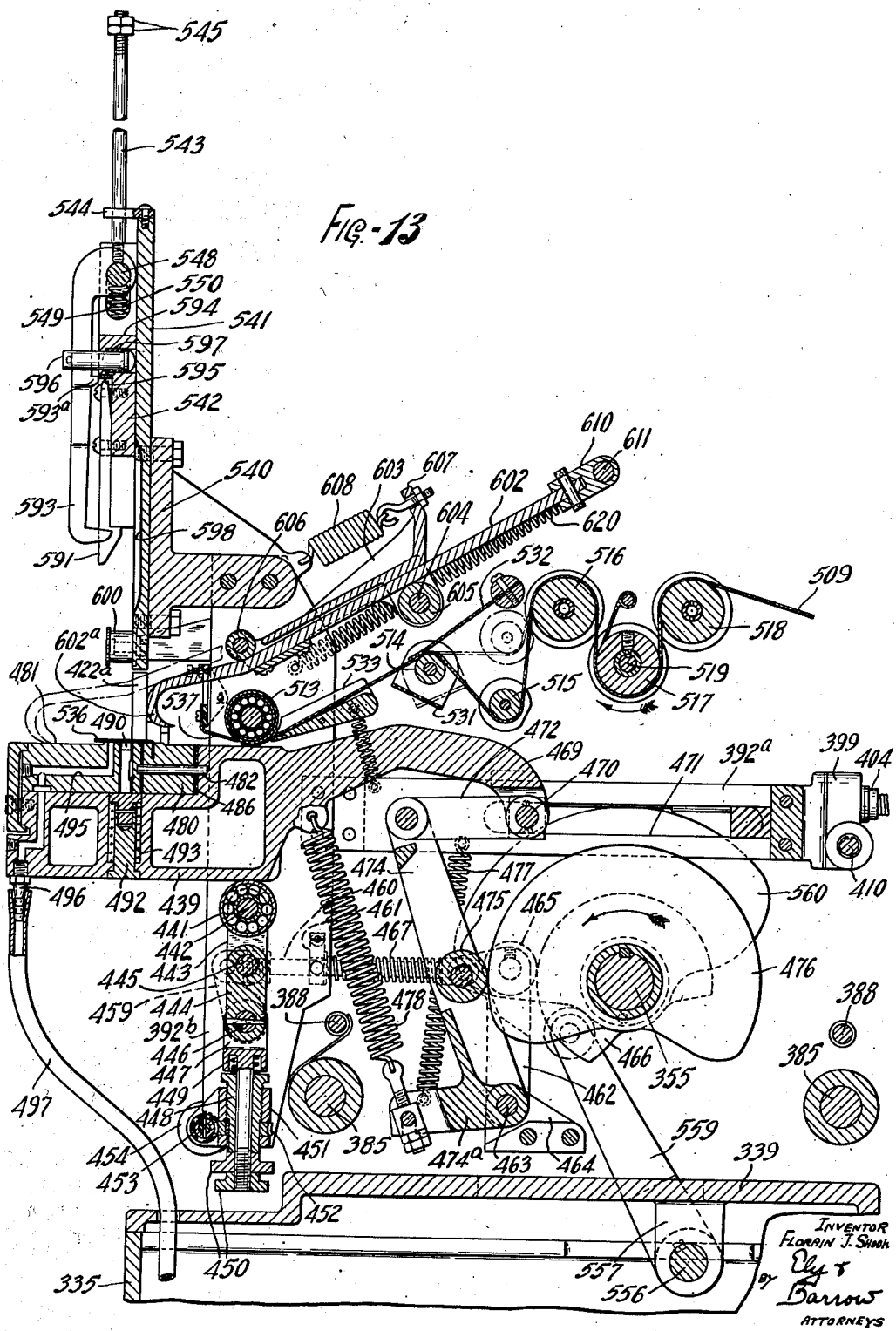
Figure 13 is a section, on a larger scale, on the line 13—13 of Figure 5.
Figure 14:
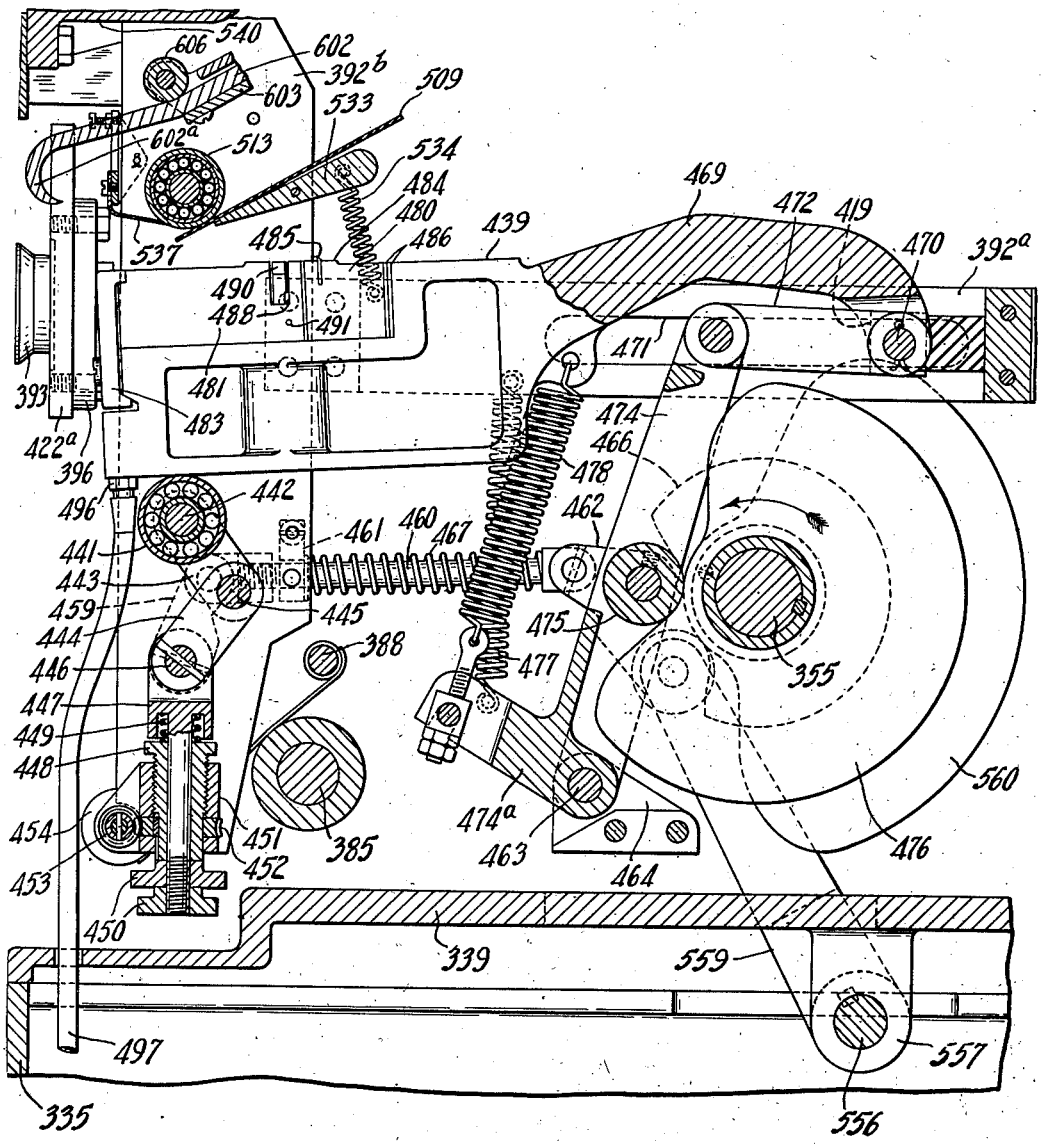
Figure 14 is a section, on a larger scale, of a portion of the mechanism shown in Figure 13, in the alternative position thereof, a part being shown in elevation.

The wrapping unit comprises a pair of reciprocable anvils, generally designated 439, 439, which are projected to forward position to determinately position respective short pieces of friction tape with relation to a bead core on feed rolls 393 and to assist in folding said tapes about said bead core, and thereafter are moved to a retracted position to permit removal of the finished work from the machine. The respective anvils are positioned between a plate 387 and side plates 392ª, 392ᵇ, at substantially the same elevation as feed rollers 393, the arrangement being such that a bead core supported normally on said feed rollers will extend over the anvils, as indicated by broken lines in Figure 2. The details of an anvil and its operating mechanism are best shown in Figures 13 and 14 to which attention especially is directed.

Each anvil 439 is a rectangular, box-like structure that rests upon a roller 441 that is journaled upon a pin 442 carried by one arm 443 of a toggle, the other arm 444 of said toggle being pivotally connected by pin 445 to arm 443, and having its other end fixed upon a short shaft 446 that is journaled in the forked upper end of a post 447. The latter is yieldingly mounted in a sleeve 448, there being a compression spring 449 between the top of sleeve 448 and the forked upper end of post 447. Lock nuts 450 on the lower end of post 447 retain it in sleeve 448 and limit its upward movement under impetus of spring 449. The sleeve 448 is threaded into a bearing bracket 451 that is fixedly mounted between plate 387 and the lower end of side plate 392, the lower end of sleeve 448 having a worm gear 452 slidably keyed thereon. Said worm gear 452 is meshed with a worm 453 that is journaled in bracket 451 and is provided with a thumb-grip 454 whereby it may be manually rotated. The arrangement is such that by rotating worm 453, sleeve 448 may be raised or lowered and thus to vary the upward pressure spring 449 exerts upon the anvil when the toggle is in the straightened position shown in Figures 4 and 13. Both pin 442 and shaft 446 extend laterally through respective slots 455 and 456, Figure 4, respectively, in plate 387 and side plate 392ᵇ to provide guiding means for the toggle structure.

The shaft 446 extends outwardly beyond side plate 392ᵇ and has mounted on its end portion a lever arm 459, the free end of which is connected to one end of a push-rod 460 that is slidably mounted in a guide block 461 swiveled on said side plate and has its other end pivotally connected to the free end of a cam lever 462. The cam lever 462 is pivotally mounted on a fulcrum pin 463 carried by a bracket 464 mounted upon plate 386, the free end of said lever carrying a cam roller 465 for engagement with a cam 466 on cam shaft 355. A compression spring 467 mounted upon push-rod 460 and abutting guide block 461 normally urges cam roller 465 against cam 466. The latter is so shaped as to move push-rod 460 to flex the toggle as shown in Figure 14 or straighten the toggle as shown in Figures 4 and 13, to raise and lower anvil 439 for a purpose presently to be explained.

For reciprocating the anvils 439 to project them beyond the front of the machine and to retract them therefrom, each of said anvils is formed with an arcuate, rearwardly extending, integral arm 469 that has a forked rear end portion provided with a transverse pivot pin 470, on the opposite ends of which are mounted slide-blocks 419. The latter are slidably mounted in respective horizontal slots 471, 471 formed in plate 387 and side plate 392ᵃ respectively. Connected to pivot pin 470 is a forwardly extending link 472 that has its other end connected to the free end of a lever arm 474 that is pivoted on fulcrum pin 463. A cam roller 475 on lever arm 474, at the medial region thereof, is engageable with a cam 476 mounted upon cam shaft 355. The lever arm 474 is formed with an angular extension 474ᵃ at its fulcrumed end, and a tension spring 477 connected to said extension and to a fixed point on side plate 392ᵃ normally urges cam roller 475 against cam 476. A tension spring 478 connected to extension 474ᵃ and to anvil 439 urges the latter downwardly against its supporting roller 441. Cam 476 is adapted to reciprocate anvil 439 in timed relation to the raising and lowering of the anvil by cam 466.

The detail construction of each anvil 439 is best shown in Figures 13, 17, and 18, wherein it will be seen that the forward portion of the top of the anvil is cut away or recessed to receive a small block 480 and a larger block 481. A dowel pin 482 extends through small block 480 and into suitable recesses in the anvil head and block 481 for positioning said blocks accurately, and a C-clamp 483 bolted to the anvil head retains the respective parts mentioned in assembled relation. The top faces of blocks 480, 481 are formed with a local, contiguous, plateau 484, and a cutter blade 485 mounted in block 480 traverses said plateau at a slight angle thereto, adjacent the rear end thereof, as is most clearly shown in Figure 5, the cutting edge of said blade extending above said plateau. The position of said plateau lengthwise of the anvil may be altered by the use of shims 486 between the end of block 480 and the anvil structure, and the length of the plateau may be varied by shims 487 inserted between blocks 480, 481. It is upon plateau 484 that a short length of friction tape is positioned, prior to operation of the machine.

Formed in block 481 of the anvil is a transverse die recess 488 that opens onto plateau 484 and extends downwardly therefrom about half way through said block. A centrally disposed cylindrical bore 489 extends from the bottom of recess 488 to the bottom of die block 481. Mounted in recess 488 and bore 489 is a T-shaped plunger 490, the stem of which is slidably secured in said bore by a tangentially disposed pin 491, the head of the plunger being of less thickness than the depth of the die recess so as to be vertically movable therein. In front of die recess 488 the plateau 484 preferably is knurled or roughened as shown at 484ᵃ, Figure 5. Mounted in the anvil head below plunger 490 is a cylindrical plunger seat 492 that is yieldingly urged upwardly by a compression spring 493, the arrangement being such as yieldingly to support plunger 490 with its top flush with the top of plateau 484.

As is most clearly shown in Figures 13 and 17, the head of each anvil 439 and die block 481 are formed with a continuous passage 495 that opens at its top onto knurled portion 484ᵃ of the plateau 484, and terminates at the bottom of the anvil where it is provided with a connection 496 to which a flexible pipe or hose 497 is attached. The flexible hoses 497 are connected at their lower ends to a common manifold 498, Figure 28, that has communication with the chamber of a pump or pressure cylinder 499, the pipes 497 constituting the only fluid inlet and outlet to said pump. The piston 500 of pump 499 is connected to one end of a lever 501 that is fixedly mounted at its other end upon a short rock shaft 502 journaled in a bracket 503 projecting downwardly from the under side of base plate 339. Also mounted upon rock shaft 502 is a bifurcated cam lever 504 that extends through the base plate and has a cam roller on its free end in engagement with a cam 505 on cam shaft 355. A tension spring 506, Figure 1, connected to lever 501 and to a fixed point on housing 335 normally urges the free end of said lever downwardly, whereby air is forced out of pump 499. The cam 505 is so arranged as to permit spring 506 to depress piston 500 to force air from pump 499 through anvil passages 495 at one stage of operation, and to lift said piston to draw air into the pump and to create a suction on the forward end of anvil-plateau 484 at another stage of operation for a purpose subsequently to be described.

*The tape-guiding means*

The short lengths of friction tape used for binding the respective ends of bead cores 155 to the body thereof are cut from respective continuous strips of friction tape 509, 509 that are drawn from supply rolls 510, 510 thereof, said supply rolls being rotatably mounted upon respective brackets 511 that are carried by the respective plates 387 at the rear of the machine. Each of said short lengths of friction tape is severed from a continuous tape 509 by the cooperation of the anvil blade 485 and a roller 513 that is journaled between plate 387 and side plate 392ᵇ, near the front of the machine. Between roller 513 and tape-supply roll 510, the tape 509 is arranged in a sinuous course about a plurality of rotatable flanged sheaves 514, 515, 516, 517, and 518, as is shown most clearly in Figures 4 and 13, which sheaves are disposed upon the outer face of plate 387. Sheave 517 is a drive pulley, being slidably keyed upon a shaft 519 that is journaled in the plates 387 and in a bracket 520 rising from bracket 356. Adjacent its outer end shaft 519 is provided with a pinion 521 that is meshed with a gear 522 that is mounted upon a short shaft 523 that is journaled in the outer end of a short arm 524 projecting laterally from bracket 520. Also mounted upon shaft 523 is a sprocket 525 that is connected by sprocket chain 526 with sprocket 527 on cam shaft 355. The gear ratio between cam shaft 355 and shaft 519 is such that the latter will make several revolutions while the cam shaft makes one revolution during an operative cycle of the machine. A scraper 528 bears against pulley 517 to prevent the tape 509 from adhering thereto.

Sheave 515 is journaled in the free end of a short arm 530, Figures 1 and 4, that is swiveled on the same axis as sheave 514. A support bracket 531 is provided for limiting the angular movement of arm 530 and sheave 515 under the force of gravity. Thus sheave 515 is disposed in a storage loop or festoon of tape 509 between sheaves 514 and 516. The loop is shortened and sheave 515 lifted to the position shown in broken lines in Figure 4 when material is withdrawn from the loop to form a short length of wrap for a bead core. The sheave moves back to its full line position by gravity when material is fed into the loop by rotation of driven pulley 517, the feed of the material ceasing when the loop is full and the tape becomes too slack to have frictional driving engagement with said driven pulley. A leaf spring 532 bears upon the tape 509 on sheave 514 with the result that the tape always is withdrawn from the storage loop under constant uniform tension, and there is no backward pull on the tape between roll 513 and sheave 514. Adjusting means 535 is provided for varying the pressure of spring 532. A pivotally mounted, laterally flanged guide 533 is positioned posteriorly of roll 513, its forward end being urged toward said roll by a tension spring 534 for holding the leading end of tape 509 against roll 513, adjacent the lowest point thereof.

The severing of the leading end portion of each tape 509 and the positioning of the severed portions determinately upon the respective anvils 439 will best be understood by reference to Figures 14 and 13 since the operation is effected by the movement of the anvil from the position shown in Figure 14 to the position shown in Figure 13. With the respective parts in the positions shown in Figure 14, the first step of the operation occurs when cam 466 moves push rod 460 to straighten the anvil-supporting toggle and thereby to raise the anvil so that the top of the forward end of the latter is disposed slightly below roll 513. Cam 476 then operates lever arm 474 to project the anvil forwardly toward the position shown in Figure 13. As this movement of the anvil progresses, plateau 484 of the anvil moves under roll 513, and the leading end of tape 509 is gripped between the knurled portion 484ª of the plateau and said roll whereby the latter is rotated and the tape is drawn forward with the anvil. As blade 485 passes under roll 513 it severs the tape 509 therebetween, the spring 449 in the anvil-supporting structure permitting the anvil to yield sufficiently for the blade to pass. Because of the oblique position of blade 485, it severs the tape progressively, whereby the cutting is facilitated. The severed end portion of each tape is designated 536, and is shown most clearly in Figure 22. At this time cam 505 comes into operation to lift piston 500 of pump 499 and thereby to create suction through pipe 497 in passage 495 in the anvil whereby the wrapper tape 536 is held to the anvil by differential air pressure on its opposite faces.

As the anvil continues its forward movement, the trailing end of plateau 484 still being urged against roller 513 continues the feed of strip 509 until the leading end thereof, back of blade 485, is beyond the lowermost point of roller 513. When the plateau 484 passes out of engagement with roller 513 the feed of tape 509 ceases, and the anvil continues its forward movement to the position shown in Figure 13. The feature of continuing the feed of the tape after its leading end portion is severed assures that the leading end of the tape will be in position to be gripped between plateau and roll 513 during the next cycle of operation. A leaf spring 537 of adjustable tension bears against roll 513 and acts as a brake to prevent overrun of the latter when plateau 484 moves out of engagement therewith.

*The work-pressing means*

When a bead core is received upon feed rolls 393 of the unit, the anvils 439 are disposed in their forward position, the tape pieces 536 cover the die slots 488 thereof, the die slots being disposed substantially in the same vertical plane as the bead core. The longitudinal feeding of the latter by said feed rolls carries the inner core-tape end into contact with pawl 429 to close switch 435 and stop the longitudinal feeding, both tape ends then being substantially in alignment with the die slots 488 of the respective anvils. When the wrapping unit is set in operation by closing of the switch 153 of the winding unit, the bead core 155 between feed rolls 393 is deformed from the arcuate shape shown in broken lines in Figure 2, to the shape shown in Figure 3, whereby the portion between said feed rolls is depressed, and those regions thereof comprising its respective tape-ends are pressed into die slots 488 of the respective anvils.

Apparatus for so pressing the bead core comprises brackets 540 mounted between each plate 387 and its side plate 392ᵇ at the upper end of the latter. Mounted upon the front of each bracket 540 is a vertical guide-plate 541, the lower end of which is positioned adjacent the top of placer plate 422 or 422ª. Slidably mounted for vertical movement on guide plate 541 is a slide or presser foot 542 that carries an upwardly extending rod 543 that slides freely through an aperture formed in an overhanging plate 544 mounted upon the upper end of guide plate 541. Nuts 545 are threaded onto the upper end of rod 543, said nuts constituting an adjustable stop to limit the downward movement of the presser foot and to define its lowermost position.

The slides or presser feet 542 are reciprocated in unison by a cross-head 547 that is positioned between guide plates 541 and carries a cross-bar 548 that projects laterally through respective vertically disposed slots 549 formed in each presser foot, there being a compression spring 550 mounted in each slot 549 beneath said cross-bar. The arrangement permits relative movement of the cross-bar and the presser feet at the lower limit of the latter's movement. Manually adjustable collars 551 are secured on cross-bar 548 against the outer lateral face of each presser foot to retain the cross-head in medial position between the said presser feet. When collars 551 are loosened, the plates 387 may be moved toward each other in the manner and for the purpose previously described.

The cross-head 547 is adjustably connected to the upper end of a connecting rod 553 that extends through a suitable slot 554 in base plate 339 and has its lower end connected to one end of a lever 555 that is mounted adjacent its opposite end upon a rock shaft 556 that is journaled in bearing brackets 557 formed on the under side of said base plate 339. The other end of lever 555 is connected to one end of a tension spring 558 that is connected at its other end to a fixed point on support 340 within housing 335. The arrangement is such that spring 558 normally urges connecting rod 553 and cross-head 547 upwardly. Also mounted upon rock shaft 556 is a cam arm 559, the free end of which carries the usual cam roller that is normally held in engagement with the surface of a cam 560 by said spring 558, the cam 560 being mounted upon cam shaft 355. The cam 560 is so arranged as to depress connecting rod 553 and cross-head 547, against the tension of spring 558, in timed relation to the movement of the other operative parts of the machine.

To prevent the bead core 155 from displacement while being deformed and while the tape strips 536 are being wrapped thereabout, means are provided for confining the depending portion of the bead core, as is most clearly shown in Figures 1 and 27. Said means comprises a rod 562 that is mounted in a rocker 563 that is pivotally mounted in a bracket 564 on the front wall of housing 335. The bracket 564 carries a rubber bumper 565 against which the rod 562 normally rests in oblique position with its upper end remote from said housing. The upper end of rod 562 carries an adjustable head 566 provided with a rubber bumper 567, the latter bearing against the housing wall when the rod is in vertical, operative position as shown in broken lines in the drawings. The rocker 563 extends through an aperture in the housing wall and has its inner end pivotally connected to one end of a link 568, the latter extending transversely of the housing and having its opposite end extended through a small aperture in the opposite wall of the housing. A compression spring 569 is mounted upon the link between a collar 570 thereon and the last-mentioned housing wall, the arrangement being such as normally to urge link 568 toward rocker 563 and yieldingly to hold the latter in the tilted position shown in full lines in the drawings.

A push rod 572 extends freely through an aperture in that end portion of link 568 that is connected to rocker 563, the push rod having yielding, lost-motion connection with the link through the agency of collars 573, 574 respectively, mounted on the push rod above and below the link, and a compression spring 575 on the push rod between collar 573 and the link. Upon the upper end of push rod 572 is a lost motion slip joint 576 having pivotal connection with a link 577 connected to the free end of lever 555. The arrangement is such that rod 562 is moved from the full line position shown in Figures 1 and 27 to the broken line position shown therein by the lever 555 in timed relation to the operation of presser feet 542.

For depressing and deforming the bead core 155, the inner or adjacent lateral sides of the presser feet 542 carry respective brackets 580 at their lower ends, and in each of said brackets is journaled a presser roller 581 that is disposed below the lower end of the presser foot, the axes of said rollers being disposed transversely with relation to the bead core. It is the rollers 581 that engage the bead core and force it to the position shown in Figure 3. This straightening of the bead core between feed rolls 393 shortens its length between the latter, and to control the resulting longitudinal displacement of the core structure so that the tape ends of the bead core will be properly positioned with relation to the anvils 439, means is provided for engaging and holding the bead core at a determinate point so that such displacement takes place at one side of said point.

Said means comprises a vertically disposed dog 583 that is slidably mounted in a bracket 584 that is mounted upon the outer lateral face of that presser foot 542 that is positioned at the right-hand side of the unit as viewed in Figures 2 and 3. The dog 583 is disposed above and in alignment with the right-hand feed roll 393, with which it cooperates in holding the bead core as presently will be explained. The lower end of the dog is sharpened as shown, and its upper end is angularly bent and connected to one end of a tension spring 585, the other end of the latter being connected to a latch member 586 that is pivotally mounted at 587 on bracket 584. The latch member 586 has an upwardly extending portion having a notched free end for engagement with the angular upper end portion of dog 583. The latch member also has a laterally extending lug engageable with an adjustable stop 588, Figures 2 and 3, carried by a bracket 589 that is mounted atop of bracket 540 when the presser foot 542 is in its uppermost position. The arrangement is such that the dog 583 is unlatched when the machine is in the inoperative position shown in Figure 2, the pointed lower end of the dog being below presser rollers 581. As the presser feet 542 are lowered, dog 583 engages bead core 155 upon the right-hand feed roll 393 and holds it stationary at this point while the presser rollers flatten the bead core between feed rolls 393; thus moving the flattened portion of the core slightly in a counter-clockwise direction and accurately positioning the tape ends of the core over die slots 488 of the anvils 439 before the core is moved into said die slots.

When the presser feet 542 are in their lowermost position, as shown in Figure 3, the upper end of dog 583 has been lifted, against the tension of spring 585, to the level of the notch in the free end of latch 586, the latter swinging into engagement with the dog by reason of the over-center connection therewith of spring 585. Thus the dog 583 is lifted from the bead core immediately the presser feet subsequently start to rise. When the presser feet reach their upper limit, latch 586 engages stop 588 and thereby is withdrawn from the dog 583, permitting the spring 586 to restore both dog and latch to normal inoperative position shown in Figure 2.

Fixedly mounted upon the front of each presser foot 542 and extending to the inner side thereof is a guide finger 591 that extends downwardly below the lower end of the presser foot, the rear edge of the guide finger being beveled as shown. The function of said guide fingers is to engage bead core 155 during the downward movement of the presser feet, and to move said bead core rearwardly to proper position over die slots 488 of the anvils if it is not already in said position so that presser rollers 581 may force the bead core into said die slots. During the rising movement of the presser feet, at which time the bead core also rises, guide fingers 591 hold the bead core in fixed position laterally as the wrapper 536 is finally folded about the bead core as presently will be explained.

For carrying the bead core upwardly with the presser feet during the rising movement of the latter, a hook 593 is associated with each presser foot 542, said hook being pivotally mounted upon cross-bar 548 in a vertical slot 594 in the top of the presser foot, and extending downwardly and angularly therefrom to a position below presser roller 581 at the same side of the presser foot, the lower end of the hook being rearwardly directed as shown. The upper half of the presser foot 542 is of greater thickness than the lower half thereof so as to provide an undercut ledge 595 on the front of the presser foot about midway between top and bottom, and the hook 593 is centrally formed with a rearwardly extending lug 593ᵃ that bears against the front face of the presser foot above ledge 595 in the elevated position of the presser foot as is shown in Figures 1, 4, and 13. In this position of the respective elements the hook 593 is so angularly disposed that the inner end of its angular lower end portion is in front of a bead core 155 when the latter is on feed rolls 393. Above lug 593ᵃ hook 593 extends through a vertical slot in a spring bolt 596 that is mounted in a bore in presser foot 542, which bore opens onto the rear face of the presser foot. Said spring bolt is formed on its rear end with a rounded head, and a spring 597, Figure 13, on said bolt bears against said head and normally urges the bolt rearwardly. The arrangement is such that hook 593 is yieldingly urged toward the presser foot and the head of spring bolt 596 is urged toward guide plate 541. Near its lower end the front face of guide plate 541 is formed with a vertical slot or cam groove 598 that is in the path of spring bolt 596 as the latter is moved down and up with the presser foot.

When the presser foot 542 is depressed to move a bead core 155 into the die slots of anvils 439, hook 593 retains its angular position shown in Figure 13 until the presser foot comes to a stop because of engagement of nuts 545 with bracket 544, see Figure 3. Subsequent downward movement of cross-bar 548 relatively of the presser foot against spring 559 moves hook 593 downwardly sufficiently for its lug 593ᵃ to clear ledge 595, whereupon spring bolt 596 moves the hook angularly toward the presser foot so that the lower, rearwardly directed end portion of the hook moves under bead core 155 as is most clearly shown in Figures 18, 19, and 20, the head of the spring bolt moving into cam groove 598 of guide plate 541. After the wrappers have been applied the bead core, as presently will be described, the presser foot moves upwardly, the hooks 593 withdrawing the work from the anvil slots and carrying it upwardly a sufficient distance to lift it off the feed rolls 393. About this time spring bolt 596 reaches the upper end of cam groove 598 and moves forwardly out of the same, thus swinging hook 593 out from under bead core 155, permitting the latter to drop and moving lug 593ᵃ of the hook out from under ledge 595 of the presser foot so as to permit spring 559 to expand and thus lift the hook relatively of the presser foot so that its lug 593ᵃ is positioned above said ledge as shown in Figure 13. A small roller 600 is journaled in the plane of the bead core upon a suitable bracket carried by left-hand bracket 540, the said roller being so positioned as to assure stripping of the work from the rising presser feet in case it is jammed between guide fingers 591 and guide plates 541.

At the time the bead core 155 is deformed and forced into die-slots 488 of anvils 439 as described, said die slots are overlaid by the short pieces of wrapper tape 536 with the result that said wrappers are pressed onto the inner periphery of the bead core by the pressure of plungers 499 and folded onto both lateral faces of the core by the lateral walls of the die slots, as is most clearly shown in Figures 18 and 23. The wrappers are positioned over the die slots in such a manner that the major portion of the wrappers are in front of the die slots so that when folded about the bead core as shown in Figure 23, that portion of each wrapper on the front of the work is longer than that portion on the rear face thereof. While the work is held within the die slots of the anvil, the respective end portions of the wrapper tapes 536 are folded onto the outer peripheral face of the work by suitable folding mechanism.

The tape-folding mechanism

Figure 12:
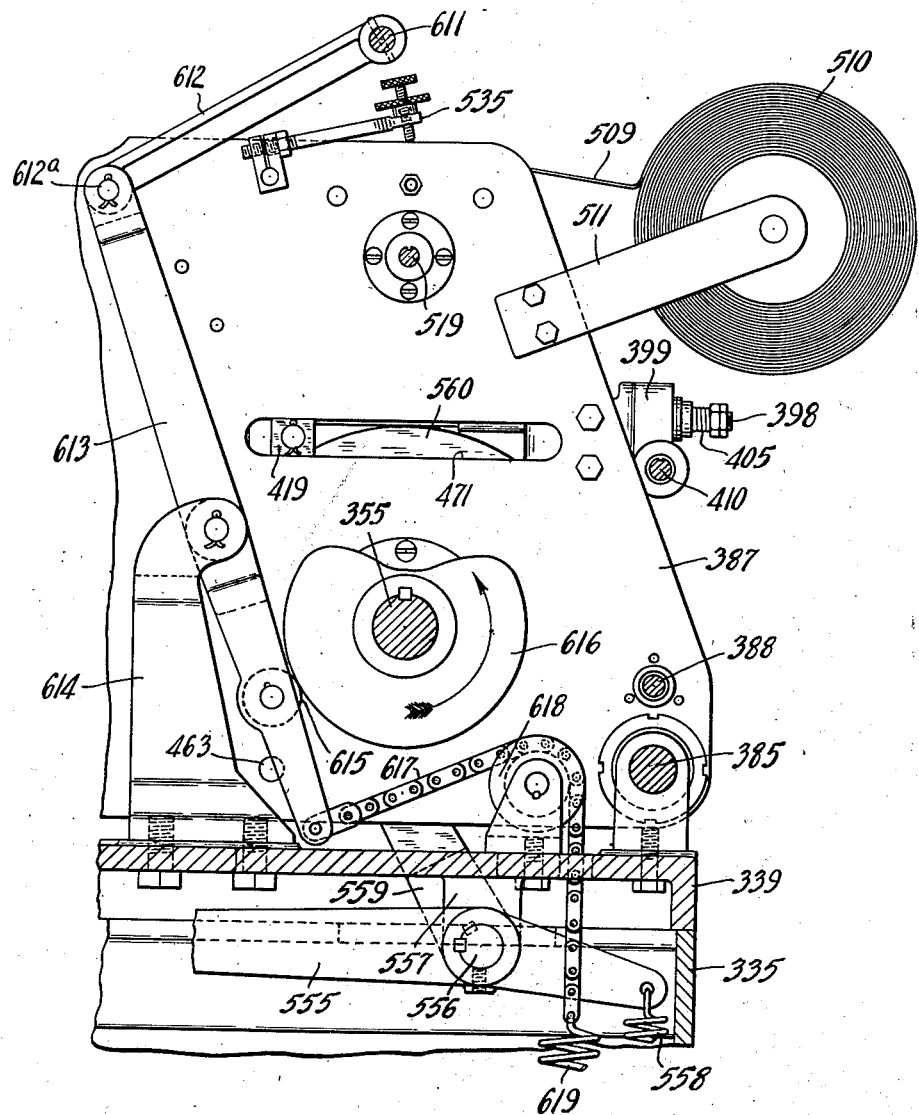
Figure 12 is a fragmentary section, on a larger scale, on the line 12—12 of Figure 5.

Each tape-folding mechanism comprises a reciprocable folder bar 602 having a work-engaging end portion formed as a turned under hook 602ᵃ. The folder bar 602 is slidably mounted for longitudinal reciprocation in a bracket 603 that is pivotally mounted at 604 at its rear end on the outer face of plate 387, between the latter and side plate 392ᵇ. The bracket 603 carries a pair of antifriction rollers 605, 606 that engage the folder bar 602 so that the latter slides easily in the bracket. An arm 607 extends upwardly from the rear end of bracket 603 and is connected to one end of a tension spring 608 that has its other end connected to a fixed point on bracket 540, the arrangement being such as normally to urge the front end of bracket 603 downwardly. The rear end of each folder bar 602 is pivotally connected to a block 610 that is pivotally mounted upon one end portion of a cross-bar 611, the latter being engaged at its middle by one end of a link 612 that has its other end pivotally connected at 612ᵃ to the upper end of a cam lever 613, as is most clearly shown in Figure 12. Cam lever 613 is pivotally mounted in its medial region upon a bracket 614, and below its pivot is provided with a cam roller 615 that is engaged with a cam 616 mounted on cam shaft 355. The lower end of cam lever 613 is connected to one end of a chain 617 that is trained over a sheave 618 and has its other end connected to a tension spring 619 that is connected to a fixed point on partition 340 in housing 335. The arrangement is such that spring 619 normally urges cam roller 615 against cam 616, and in this it is supplemented by a pair of tension springs 620 that are connected to crossbar 611 at each side of link 612 and to fixed points on the respective side plates 392ᵇ.

Although the spring 608 is so arranged as normally to tilt the forward end of bracket 603 downwardly, it can tilt it no farther than the oblique position shown in Figures 1, 4, and 13, in the inoperative position of the apparatus, by reason of the relative positions of bracket pivot 604 and pivotal connection 612ᵃ of the operating link 612 of the folder bar. Thus the hook end 602ᵃ of the folder bar normally is maintained above anvil 439 and slightly to the rear of wrapper tape 536 thereon. At the proper moment during the operative cycle of the unit, that is, after the presser feet have been depressed and the bead core 155 has moved into die slots 488 of anvils 439, as shown in Figures 3 and 18, cam 616 arrives at the proper angular position to permit springs 619 and 620 to project the hook bars 602 forwardly and downwardly. Each downwardly moving hook end 602ª strikes a plateau 484 just in front of cutter 485, and then slides forwardly across the plateaus to the positions shown most clearly in Figure 19, thus folding the short end portion of tape 536 onto the outer periphery of the work as shown in Figure 24. The spring 608 of bracket 603 permits the latter yieldingly to tilt as the hook slides across plateau 484, and thus exerts downward pressure on the hook end 602ª so that the tape is firmly pressed onto the work. As shown in Figure 19, hook end 602ª is in front of the long end portion of tape 536, the latter having been flattened down onto the plateau by the action of the hook.

With the respective elements in the positions described, cam 505 arrives at the proper angular position to permit spring 506 to depress the piston 508 of pump 499 and thus to force air under pressure through passage 495 in anvil 439. Since the long end portion of tape 536 overlies the terminus of passage 495, said tape end is subjected to an upwardly directed jet of air that lifts it off the plateau. Hook end 602ª then starts its retractive movement wherein it slides rearwardly across plateau 484 to the position shown in Figure 20, and in so doing engages the long end portion of tape 536 and lays it onto the outer periphery of the work, overlapping the short tape end thereon as is shown in Figure 25. This still leaves a short portion of the tape end projecting laterally from the work, and this subsequently is folded down onto the work as presently will be described. The hook 602 continuing its movement from the position shown in Figure 20 rises to its normal inoperative position shown in Figures 4, 13, and 17.

The work-removing means

For removing finished work from the wrapping unit, there is provided a swinging arm 625 that is carried on the upper end of a vertical spindle 626 that is journaled in a bearing bracket 627. The latter is positioned at one of the rear corners of the machine, being carried upon an angular bracket arm 628 that is secured to one of the plates 387. To the lower end of spindle 626 is secured an arm 629 that is pivotally connected by link 630 to the free end of a rocker arm 631 that is mounted upon one end of a rock shaft 632. The latter is journaled in the respective end portions of bracket arm 628 and carries a torsion spring 633 that normally urges spindle 626 to rotation in the direction that swings arm 625 toward the wrapping mechanism, where its free end portion normally bears against the outer edge of placer plate 422. The rock shaft 632 also carries a lever arm 635 that projects forwardly into the orbit of a stud 636 that projects from a lateral face of cam 476 as is most clearly shown in Figure 4. The arrangement is such that engagement of stud 636 with lever arm 635 will move swinging arm 625 from the normal position shown in full lines in Figure 5 to a position at right angles thereto as indicated in broken lines therein. The free end of the swinging arm 625 is bent and hooked as shown and so positioned below and forwardly of the adjacent feed roll 393 as not to interfere with the reception of bead cores upon the feed rolls and to be in position to receive the bead cores when they are released from the machine in finished condition.

Operation of the wrapping unit

The normal inoperative position of the wrapping unit is shown in Figure 1 wherein it will be seen that the presser feet 542 are elevated, the anvils 439 are in their forwardly projected position and have short pieces of friction tape 536 thereon, the work-holding rod 562 being in the inclined position shown, the work-removing arm 625 being in normal inoperative position, and the motor 341 being constantly running and frictionally driving feed rolls 393. The electrical circuit shown in Figure 29 is independent of the power circuit to motor 341, and its switch 435 is open and solenoid 373 is deenergized.

When a bead core 155 is received upon the driven feed rolls 393, it is fed longitudinally in a clockwise direction until the inner end of its constituent wire tape engages finger 429 to tilt the same and close switch 435. The finger 429 also stops further longitudinal feeding of the work, the latter stopping with its overlapped end portions substantially in alignment with die slots 488 of anvils 439. Feed rolls 393 cease rotating because of their light frictional drive. The machine remains in the condition that now obtains until switch 153 of the winding unit is closed, and the latter unit is timed to close said switch a sufficient interval after the wound bead core is ejected therefrom to permit the foregoing operations of the wrapping unit to be effected. Closing of switch 153 causes the solenoid 373 to be energized and thus to operate one-revolution clutch 354 so that cam shaft 355 is driven one complete revolution by motor 341, solenoid 373 again being deenergized by opening of switch 153 before the said cam shaft completes one revolution. As cam shaft 355 starts rotation, cam 560 first comes into operation to move presser feet 542 downwardly toward the position shown in Figure 3, and concurrently to lift the work-holding rod 562 from its inclined, full line position shown in Figures 1 and 27 to the position shown in broken lines in said figures, whereby the depending portion of the work is restrained against any substantial lateral movement.

As presser feet 542 descend, dog 583 first engages the work over feed roll 393 at the right-hand side of the machine, and hold this point of the work fixedly against longitudinal movement. Upon further downward movement of the presser feet, presser rollers 581 on the latter engage the work between feed rolls 393 and depress it, thus deforming the work from its natural arcuate shape to the substantially straight form shown in Figure 3 between feed rolls 393. Since the bead core is held fixedly by dog 583, displacement of the bead core structure due to change from arcuate to flat form causes such movement of the work to the left as viewed in Figure 3, as accurately to position the overlapping ends of the work with relation to anvils 439. As the presser rollers 581 urge the bead core downwardly, guide fingers 591 on the respective presser feet force the said bead core rearwardly against guide plates 541 and placer plates 422, 422ª so as accurately to position the work with relation to die slots 488 in anvils 439, into which the work is pressed as the presser feet reach the limit of their downward movement, as is shown in Figure 18. This folds the wrapper tapes 536 about three sides of the work as shown in Figure 23. As the presser feet cease their downward movement, further movement of cross-bar 548 causes the hooks 593 to be released and their lower ends to move under the bead core as shown in Figures 18, 19, and 20.

With the respective elements of the machine in the position described, cam 616 comes into play to permit springs 619 and 620 to project hook arm 602 forwardly and then to retract it as previously described, whereby the respective end portions of wrapper tapes 536 are folded onto the outer periphery of the work in succession as shown in Figures 19, 20, 24, and 25. As previously stated, during this operation cam 505 causes pump 499 to force a jet of air through the respective anvils and below the wrappers 536 to facilitate the folding operation.

Next, cam 560 reaches the position that permits spring 559 to move presser feet 542 upwardly toward their normal inoperative position. In the initial phase of this operation, cross-bar 548 moves relatively of the presser feet, due to expansion of springs 550, thus drawing hooks 593 upwardly into engagement with the work as shown in Figure 21. Then as the presser feet start to rise the work is lifted from the die slots in the anvils and carried upwardly, and while firmly held on three sides by hooks 593, guide fingers 591, and presser rollers 581, has its rear lateral face moved along the front face of the respective guide plates 541 with the result that the rearwardly projecting end portions of wrapper tapes 536 are folded and wiped down upon the rear lateral face of the work as shown in Figure 26. As the presser feet move upwardly work-holding rod 562 moves back to its inclined, inoperative position.

At about the time the bead core has been lifted sufficiently to clear the feed rolls 393, cams 466 arrive at the proper position to break the toggles that support the respective anvils on rollers 441, thereby lowering said anvils, and cams 476 reach the position that allows springs 478 to move said anvils rearwardly through the agency of cam levers 474 to the position shown in Figures 14 and 21. As the anvils move rearwardly, slide blocks 419 move away from the respective collars 417 of the placer plate mechanism and permit springs 418 to move the slides 396 rearwardly and with them the feed rolls 393 and placer plates 422, 422ᵃ carried by said slides. Rearward movement of the anvils and feed rolls takes them out of the plane of the work before the rising movement of the presser feet carry spring bolts 596 therein out of cam grooves 598 in guide plates 541. As the said spring bolts move out of cam grooves 598 they swing the hooks 593 angularly so as to withdraw their lower end portions from beneath the work, permitting the latter to drop. If the work should stick to the presser feet it will be stripped therefrom upon encountering the projecting stripper roller 600 that is positioned on the path of the upwardly moving work. As the work drops it is caught upon the angular end portion of swinging arm 625. Then stud 636 on cam 476 engages and lifts lever arm 635 with the result that arm 625 is swung in a 90° arc to carry the finished work, shown most clearly in Figure 28, away from the machine to a point where it may be manually or mechanically removed from the swinging arm as desired. The swinging arm immediately returns to its normal inoperative position.

As cams 466 and 476 continue to rotate, cams 466 straighten out the anvil-supporting toggles to raise the anvils, and cams 477 operate to project the anvils forwardly. During the forward movement of the anvils they engage the tapes 509 on rollers 513 and sever the short pieces of wrapper 536 from the leading ends thereof as previously has been described. During this operation cam 505 lifts piston 500 of pump 499 to produce suction on the under side of said wrapper tapes whereby they are held firmly to the plateaus 484 on the respective anvils. Forward movement of the anvils carries slides 396 forwardly, and with them placer plates 422, 422ᵃ and feed rolls 393. When the anvils and slides have reached their normal forward, inoperative positions, dog 368ᵃ of the one-revolution clutch engages solenoid lever 370, thereby stopping rotation of cam shaft 355 in determinate angular position. This completes a cycle of operation of the wrapping unit, which is repeated automatically as often as there is work in the wrapping unit and the winding unit is in operation. When the wrapping unit is not associated with a winding unit, the switch 153 is absent from the circuit shown in Fig. 29, the machine then being put into operation by the closure of switch 435 by the work.

The apparatus is fully automatic in operation; it is easily and quickly adjustable for the manufacture of bead cores of different diameters and thickness; it is capable of large production; and it achieves the other advantages set out in the foregoing statement of objects.

Modification may be resorted to without departing from the spirit of the invention or the scope of the appended claims, which are not limited wholly to the specific construction shown and described.

What is claimed is:

1. In apparatus for making tire beads consisting of a strand of bead-making material wound to circular form, a wrapping unit comprising means for receiving a tire bead and feeding it longitudinally about its own axis to a determinate angular position with relation to the ends of the strand of material, and means for applying binder tape to the bead after it is so positioned.

2. In apparatus for making tire beads, a wrapping unit comprising means for receiving a tire bead and feeding it longitudinally about its own axis to a determinate angular position, means for applying binder tape to the bead after it is so positioned, and means operated by the work in its longitudinal movement controlling said tape-applying means.

3. In apparatus for making tire beads, a wrapping unit comprising means for receiving a tire bead and feeding it longitudinally about its own axis, a pivotally mounted finger engageable with the inner periphery of the tire bead so as to be moved angularly by the inner end of the bead wire as the latter is so fed, an electrical switch associated with said finger and operated by angular movement thereof, and means for applying binder tape to the bead, the operation of said means being controlled by said switch.

4. In apparatus for making tire beads, a wrapping unit comprising means for receiving a tire bead and feeding it longitudinally about its own axis, a yielding stop normally contacting the inner periphery of the bead as it is so fed, said stop being engageable with the inner end of the bead wire so as to bring the bead to a stop in determinate angular position, means for applying binder tape to the bead after it is so positioned, an electrical switch controlling the operation of the tape applying means, and means for causing the yielding stop to operate said switch.

5. In apparatus for making tire beads, a wrapping unit comprising means for applying binder tape to a tire bead, means for moving the tire bead relatively of said tape-applying means, and means controlling the operation of the tape-applying means actuated by the moving bead.

6. In apparatus for making tire beads, a wrapping unit comprising a pair of frictionally driven feed rolls for supporting a bead and feeding it longitudinally about its own axis, means for stopping the feed of the bead in determinate angular position and holding it against the force of the frictionally driven feed rolls, and means for applying binder tape to the bead while it is so held.

7. In apparatus for making tire beads, a wrapping unit comprising a pair of driven feed rolls for supporting a bead and feeding it longitudinally, means for stoping the feed of the bead in determinate angular position, means for applying binder tape to the bead while it is stationary, means for ejecting the finished bead from the unit, and means for moving the feed rolls out of their normal operative plane during the ejecting operation in timed relation to the operation of the ejecting means.

8. In apparatus for making tire beads, a wrapping unit comprising means for pendulously supporting a tire bead, means for applying binder tape to the bead as it is so supported, and means operating concurrently with the tape applying means for engaging the depending portion of the bead to restrain it against pendulous movement.

9. In apparatus for making tire beads, a wrapping unit comprising means for supporting a tire bead and feeding it longitudinally, means for stopping the feed of the bead when the latter is in determinate angular position, means for effecting a small recessive movement of the bead to position its end portions accurately in registry with a tape-applying means, and means for applying binder tape locally to the bead.

10. In apparatus for making tire beads, the combination of means for supporting a tire bead and feeding it longitudinally, means for stopping the feed of the bead when the latter is in determinate angular position, means for locally deforming the bead from arcuate to flat form in the region of said supporting means, and means for applying binder tape to the bead in the deformed region thereof.

11. In apparatus for making tire beads, the combination of means for pendulously supporting a tire bead at two spaced apart points, means cooperating with one of said supporting means for gripping the bead, means for deforming the bead, from arcuate to flat form between said supporting means, whereby the displacement of the bead structure caused by said deforming causes longitudinal movement of the bead structure away from the point at which it is gripped, and means for applying binder tape to the bead in the deformed region thereof.

12. In apparatus for making tire beads, the combination of a pair of feed rolls for pendulously supporting a tire bead and peripherally driving it longitudinally about its own axis, means for stopping the feed of the bead when the latter is in determinate angular position, means for deforming the bead between said feed rolls, means for applying binder tape locally to the deformed portion of the bead, and means carried by said deforming means and cooperating with one of the feed rolls for effecting a slight recessive movement of the bead, relatively of the tape-applying means, as the bead is deformed.

13. In apparatus for making tire beads, the combination of an anvil formed with a slot, means for positioning a short piece of binder tape over said slot, means for pressing a tire bead into said slot whereby the tape is folded about three sides of the bead, and means for folding both tape ends in succession onto the fourth side of the bead.

14. In apparatus for making tire beads, the combination of an anvil formed with a transverse slot adapted to support a short length of adhesive tape over said slot, means for pressing a tire bead into said slot whereby the tape is folded about three sides of the bead, means for folding the tape ends onto the other side of the bead while the latter is in said slot, means for removing the bead from the slot, and means for reciprocating the anvil to mount the short piece of adhesive tape thereon.

15. In apparatus for making tire beads, the combination of an anvil formed in its upper face with a transverse slot adapted to receive a tire bead, a plateau formed locally on the anvil at each side of said slot, a fixedly positioned roller over the anvil, and means for moving the anvil relatively of said roller so that the leading end portion of a continuous strip of wrapping material, normally disposed beneath said roller, is gripped between the latter and the anvil plateau and drawn forward a determinate distance.

16. A combination as defined in claim 15 including a blade projecting above the plateau and adapted to sever the wrapping material as it passes under the roller.

17. A combination as defined in claim 15 including a blade projecting above the plateau, obliquely with relation to the movement of the anvil, adapted to sever the wrapping material progressively as it passes under the roller.

18. A combination as defined in claim 15 including a blade projecting upwardly from the plateau, adjacent the rear end thereof, adapted to sever the wrapping material before the forward feeding of the latter ceases due to disengagement of the plateau and roller.

19. In apparatus for making tire beads, the combination of an anvil formed with a slot for receiving a tire bead, a fixedly positioned roller under which a strip of wrapping material extends, and means for moving the anvil relatively of the roller to draw the leading end of the wrapping material forwardly onto the anvil, said means comprising means for moving the anvil vertically and horizontally in determinate sequence.

20. In apparatus for making tire beads, the combination of an anvil formed with a slot for receiving a tire bead, a fixedly positioned roller under which a strip of wrapping material extends, and means for moving the anvil relatively of said roller to draw the leading end of the strip of material onto the anvil and to sever it thereon, said means comprising a toggle for moving the anvil vertically, a lever for reciprocating the anvil forwardly and rearwardly, and means for operating the toggle and lever in timed sequence.

21. A combination as defined in claim 20 including yielding means associated with the toggle normally urging the anvil upwardly against the roller.

22. In apparatus for making tire beads, the combination of an anvil formed with a transverse slot for receiving a tire bead, a plateau formed on the upper face of the anvil at each side of said slot, means for positioning a piece of wrapping material on said plateau, and means for applying suction to said wrapping material to hold it on said plateau, and applying air pressure to said material to lift it therefrom at determinate time intervals.

23. In apparatus for making tire beads, the combination of a pair of members for pendulously supporting a tire bead, an anvil normally positioned below the upper part of the tire bead and formed with a transverse slot for receiving the tire bead, means for positioning a piece of wrapping material on the anvil over said slot, means for depressing the tire bead into the anvil slot, lifting it therefrom and then releasing the bead, and means for concurrently retracting the support members and the anvil out of the plane of the bead in timed relation to the operation of the bead-depressing means to permit the released bead to be removed from the machine.

24. In apparatus for making tire beads, the combination of a pair of members for pendulously supporting a tire bead, a vertically reciprocable presser foot adapted to engage the bead and deform it, between said supporting members, from arcuate to straight form, and means for folding wrapping material about the bead in said straight region, while the bead is so deformed.

25. In apparatus for making tire beads, the combination of a pair of members for pendulously supporting a tire bead, a reciprocable anvil formed with a transverse die slot over which a piece of wrapping material is positioned, a vertically reciprocable presser foot adapted to deform the bead between said supporting members to force the bead into said die slot, and means for reciprocating the presser foot and anvil in timed relation to each other.

26. In apparatus for making tire beads, the combination of a pair of spaced supports for a tire bead, a reciprocable presser foot adapted to deform the bead, between said supports, from arcuate to straight form, guide means on the presser foot for accurately positioning the bead laterally as it is being deformed, and means for folding a strip of wrapping material about the deformed portion of the bead.

27. In apparatus for making tire beads, the combination of a pair of spaced supports for pendulously supporting a tire bead, a reciprocable presser foot adapted to descend upon the bead, between said supports, and deform it from arcuate to straight form therebetween, means for folding wrapper material about the deformed portion of the bead, and means carried by the presser foot adapted to so engage the bead as to lift the latter above said supports during the subsequent rising movement of the presser foot.

28. In apparatus for making tire beads, the combination of a pair of spaced supports for pendulously supporting a tire bead, a vertically movable presser foot adapted to deform the bead, from arcuate to straight form, between said supports, means for folding wrapper material about the deformed portion of the bead, means for reciprocating the presser foot, said means having lost motion connection therewith, and a hook operated by the said lost motion adapted to engage the deformed portion of the bead so as to lift the latter above the said supports during the rising movement of the presser foot.

29. A combination as defined in claim 28 including means for causing the hook to release the bead at a determinate point during the rising movement of the presser foot.

30. In apparatus for making tire beads, the combination of an anvil formed with a die slot, means for positioning a piece of wrapping material over said slot, a vertically movable presser foot adapted upon descent to press a tire bead into said anvil die slot, means for reciprocating the presser foot, a yielding connection between said presser foot and its reciprocating means, a positive stop for the presser foot in its lowered position whereby relative movement of the presser foot and its reciprocating means is effected, and a hook carried by said presser foot and operated by the relative movement between the latter and its reciprocating means, said hook being adapted to engage under the bead so as to lift the bead from the anvil in the subsequent rising of the presser foot.

31. A combination as defined in claim 30 including cam means for causing the hook to release the bead after it has lifted it a determinate distance.

32. A combination as defined in claim 30 including means for causing the hook to move out from under the bead after it has lifted it a determinate distance, and means in the path of the bead for positively stripping it from the presser foot after its release from the hook.

33. In apparatus for making tire beads, the combination of an anvil formed with a transverse die slot, means for positioning a strip of wrapping material over said die slot, a reciprocable presser foot adapted to be lowered to press a tire bead into said die slot to fold the strip of material about three sides of the bead, means for folding the strip ends onto the other side of the bead while it is in said slot, means on the presser foot for engaging the bead so as to lift the latter from the die slot upon rising movement of the presser foot, and a plate so positioned laterally of the bead as to be contacted thereby in its rising movement, whereby a projecting end of the wrapper strip is wiped down onto the side of the bead.

34. In apparatus for making tire beads, the combination of a member formed with a slot, means for positioning a piece of wrapping material over said slot, means for pressing a tire bead into said slot so as to fold said wrapping material about three sides of the bead, and a reciprocable member adapted to pass back and forth across the bead and wrapping material so as to fold the respective end portions of the material onto the fourth side of the bead.

35. A combination as defined in claim 34 including a hook-shaped work-engaging portion formed on one end of the reciprocable member.

36. In apparatus for making tire beads, the combination of an anvil formed with a slot, means for positioning a piece of wrapping material over said slot, means for pressing a tire bead into said slot so as to fold the wrapping material about three sides of the bead, a reciprocable folder member obliquely disposed with relation to said anvil, means for reciprocating the folder member to cause it to pass back and forth across the bead and wrapping material, and a support in which said folder member is slidably mounted, said support being pivotally mounted to permit the folder member to change its angle of obliquity upon engagement with the work.

37. A combination as defined in claim 36 including yielding means associated with the fold- 38. In apparatus for making tire beads, the combination of means for receiving a tire bead, applying wrapping material thereto, and ejecting the finished bead, and means extending through the bead and operating in timed relation to the ejecting mechanism for catching the ejected bead and carrying it to a point removed from the wrapper applying means.

39. In apparatus for making tire beads, the combination of means for receiving a tire bead, applying wrapping material locally thereto, and ejecting the finished bead, and an angularly movable swinging arm operating in timed relation to the ejecting mechanism for catching the ejected bead and swinging it to a point removed from the wrapper applying means.

40. In apparatus for making tire beads, the combination of means for locally deforming a tire bead from arcuate to straight form, means for folding wrapping material locally about three sides of the bead as it is being deformed, means for folding the end portions of the wrapping material onto the fourth side of the bead as it is so deformed, and means for folding down a projecting end portion of the wrapping material onto the bead as the latter is restored to normal arcuate form.

41. The combination which comprises a wrapping device adapted to apply a binder locally to at least one determinate region of an annular tire bead, said device comprising means for receiving a tire bead therein in chance arrangement angularly, and means for turning the bead about its own axis to a determinate angular position with relation to the structure of the bead as a pre-requisite to the applying of the binder thereto.

42. In apparatus for making tire beads, the combination of a yielding member, means for positioning a short piece of friction tape thereupon, means for pressing a tire bead onto said yielding member, intermediate the respective ends of said tape, whereby the tape is pressed against one side of the bead and bent around the corners thereof, and means for folding the unattached portions of the tape onto the bead structure, in succession, so that one end of the tape overlaps the other end portion thereof on one side of the bead.

43. In apparatus for making tire beads, the combination of means for receiving a tire bead, applying wrapper material thereto, and ejecting a finished bead, means normally extending through the bead for catching it when so ejected, and means for operating the bead-catching means, after a bead has dropped thereonto, to cause said bead-catching means to carry the bead to a point removed from the wrapper-applying means.

FLORAIN J. SHOOK.